(12) United States Patent
Meo et al.

(10) Patent No.: US 11,695,686 B2
(45) Date of Patent: *Jul. 4, 2023

(54) SOURCE-INITIATED DISTRIBUTION OF SPINE NODE IDENTIFIERS OF PREFERRED SPINE NODES FOR USE IN MULTICAST PATH SELECTION

(71) Applicant: Cisco Technology, Inc., San Jose, CA (US)

(72) Inventors: Francesco Meo, San Jose, CA (US); Stig Ingvar Venaas, Oakland, CA (US); Rahul Savarapu Parameswaran, Union City, CA (US); Ramakrishnan Chokkanathapuram Sundaram, Fremont, CA (US); Mankamana Prasad Mishra, Dublinca, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 101 days.

This patent is subject to a terminal disclaimer.

(21) Appl. No.: 17/234,115

(22) Filed: Apr. 19, 2021

(65) Prior Publication Data

US 2021/0243113 A1 Aug. 5, 2021

Related U.S. Application Data

(63) Continuation of application No. 16/453,044, filed on Jun. 26, 2019, now Pat. No. 11,038,794.

(51) Int. Cl.
*H04L 45/16* (2022.01)
*H04L 45/00* (2022.01)
*H04L 45/125* (2022.01)

(52) U.S. Cl.
CPC ............ *H04L 45/16* (2013.01); *H04L 45/125* (2013.01); *H04L 45/32* (2013.01)

(58) Field of Classification Search
None
See application file for complete search history.

(56) References Cited

U.S. PATENT DOCUMENTS

2014/0153437 A1 6/2014 Tracy et al.
2014/0258485 A1 9/2014 Yang et al.
(Continued)

OTHER PUBLICATIONS

Cisco Systems, Inc., "Cisco IP Fabric for Media", Apr. 2019, 47 pages.
(Continued)

*Primary Examiner* — Christine T Duong
(74) *Attorney, Agent, or Firm* — Edell, Shapiro & Finnan, LLC

(57) ABSTRACT

A router node may be configured for communication of multicast traffic in a network fabric which may include a plurality of spine nodes interconnected to a plurality of leaf nodes. The router node may be configured as one of the leaf nodes and serve as a first hop router for multicast traffic. At the router node, a message for flooding the network fabric may be sent based on an indication of communication of multicast traffic for a multicast group from a source device. The message may include at least one spine node identifier of at least one preferred spine node joined to the multicast group at the router node. The message may be for indicating, to at least one of the leaf nodes, to prioritize joining to the multicast group at the at least one preferred spine node according to at least one spine node identifier.

20 Claims, 19 Drawing Sheets

EXAMPLE PRODUCT AND ARCHITECTURE WITHIN WHICH INVENTIVE TECHNIQUES MAY BE IMPLEMENTED

(56) References Cited

U.S. PATENT DOCUMENTS

| | | | |
|---|---|---|---|
| 2015/0127797 A1 | 5/2015 | Attar et al. | |
| 2015/0372827 A1 | 12/2015 | Dong et al. | |
| 2016/0330125 A1* | 11/2016 | Mekkattuparamban | ........................ H04L 45/32 |
| 2017/0214619 A1 | 7/2017 | Chu et al. | |
| 2018/0041360 A1 | 2/2018 | Shen et al. | |
| 2018/0062930 A1 | 3/2018 | Dhesikan et al. | |
| 2018/0183706 A1 | 6/2018 | Przygienda et al. | |
| 2018/0302321 A1 | 10/2018 | Manthiramoorthy et al. | |

OTHER PUBLICATIONS

N. Bhaskar et al., "Bootstrap Router (BSR) Mechanism for Protocol Independent Multicast (PIM)", Network Working Group, Request for Comments: 5059, Obsoletes: 2362, Updates: 4601, Category: Standards Track, Jan. 2008, 41 pages.

IJ. Wijnands et al., "PIM Flooding Mechanism (PFM) and Source Discovery (SD)", Internet Engineering Task Force (IETF), Request for Comments: 8364, Category: Experimental, ISSN: 2070-1721, Mar. 2018, 18 pages.

\* cited by examiner

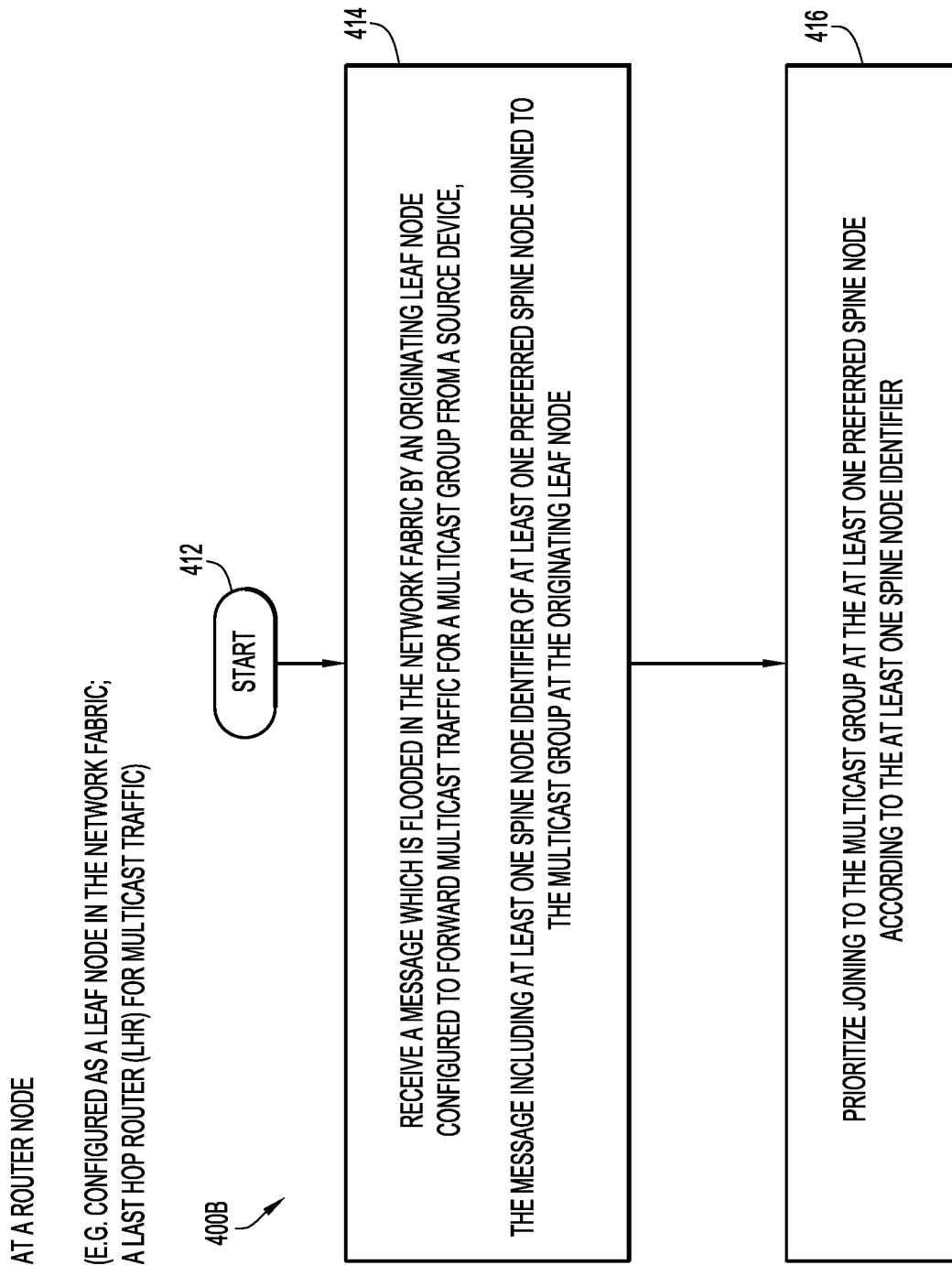

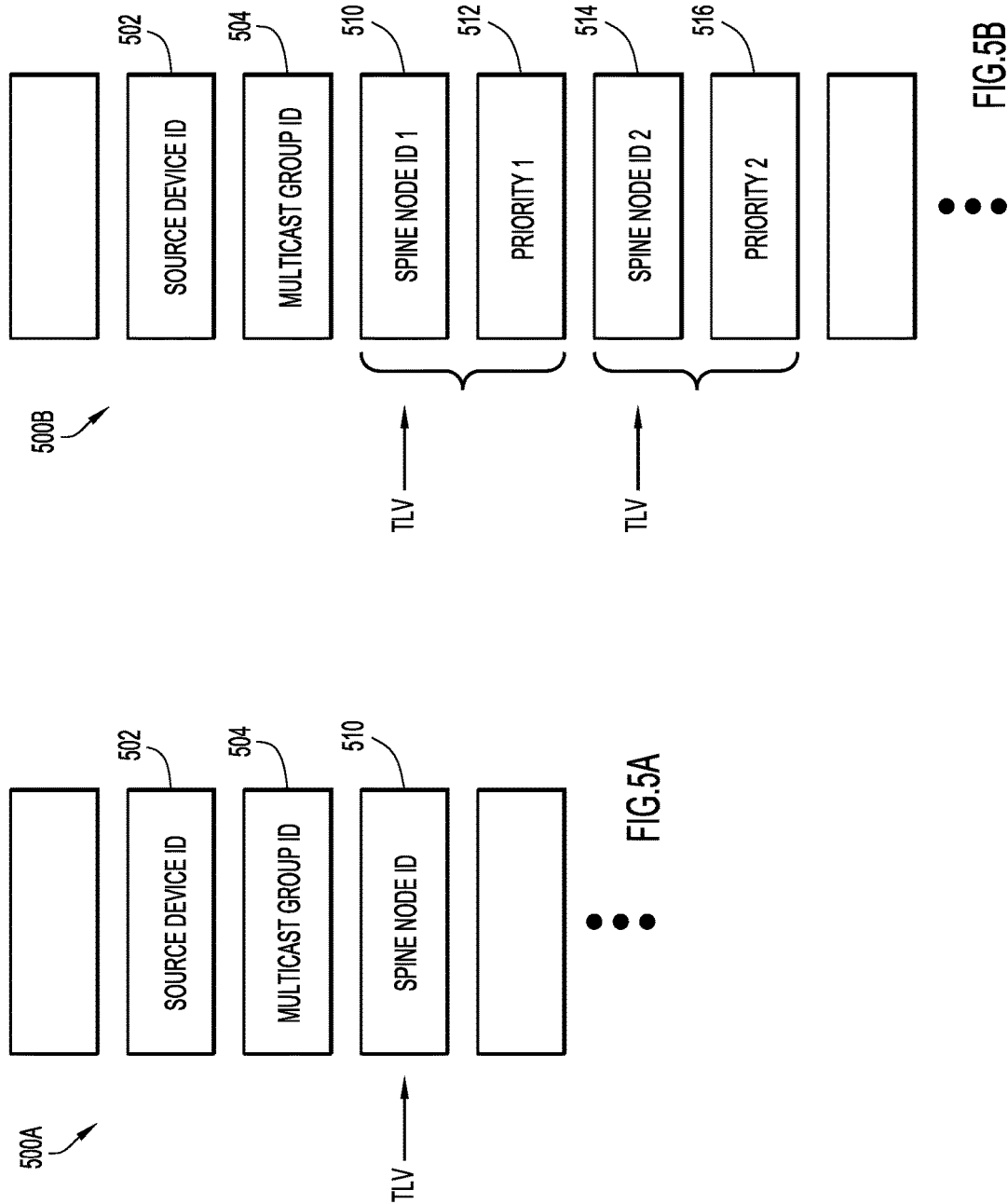

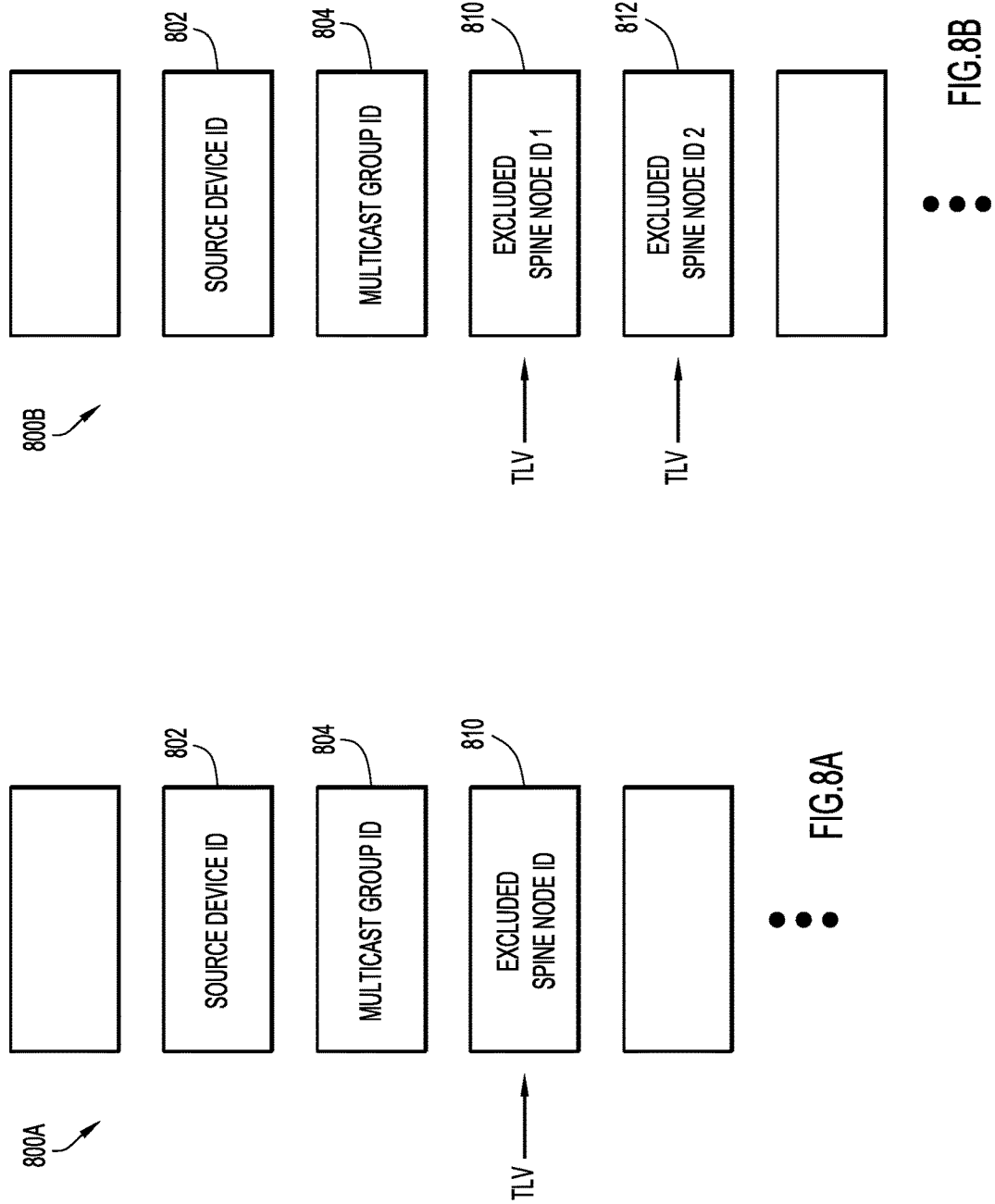

SOURCE-INITIATED DISTRIBUTION OF SPINE NODE IDENTIFIERS OF PREFERRED SPINE NODES FOR USE IN MULTICAST PATH SELECTION

CROSS-REFERENCE TO RELATED APPLICATIONS

This application is a continuation of U.S. patent application Ser. No. 16/453,044, filed Jun. 26, 2019, and issued on Jun. 15, 2021 as U.S. Pat. No. 11,038,794, the entirety of which is incorporated herein by reference.

TECHNICAL FIELD

The present disclosure relates generally to multicast traffic delivery in communication networks, and more particularly to techniques which involve a source-initiated distribution of one or more spine node identifiers of one or more preferred spine nodes for use in multicast path selection.

BACKGROUND

Multicast traffic may be delivered from one or more source devices to a plurality of receiver devices via a network fabric of interconnected router nodes. The interconnected router nodes may include a plurality of spine nodes interconnected to a plurality of leaf nodes in a spine and leaf architecture. In these and other similar environments, there are needs for improving multicast path selection for efficient multicast traffic delivery, including a need for reducing or eliminating unnecessary replication of multicast traffic between source and receiver devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4B is a flowchart of a method for use in multicast path selection according to some implementations of the present disclosure, applicable to a LHR for multicast traffic and relating to the first set of inventive aspects of the present disclosure.

FIGS. 5A and 5B are illustrative examples of a message for flooding a network fabric for multicast path selection according to some implementations of the present disclosure, relating to the first set of inventive aspects of the present disclosure.

FIGS. 8A and 8B are illustrative examples of a message for flooding a network fabric for multicast path selection according to some implementations of the present disclosure, relating to the second set of inventive aspects of the present disclosure.

DESCRIPTION OF EXAMPLE EMBODIMENTS

Figure 1:
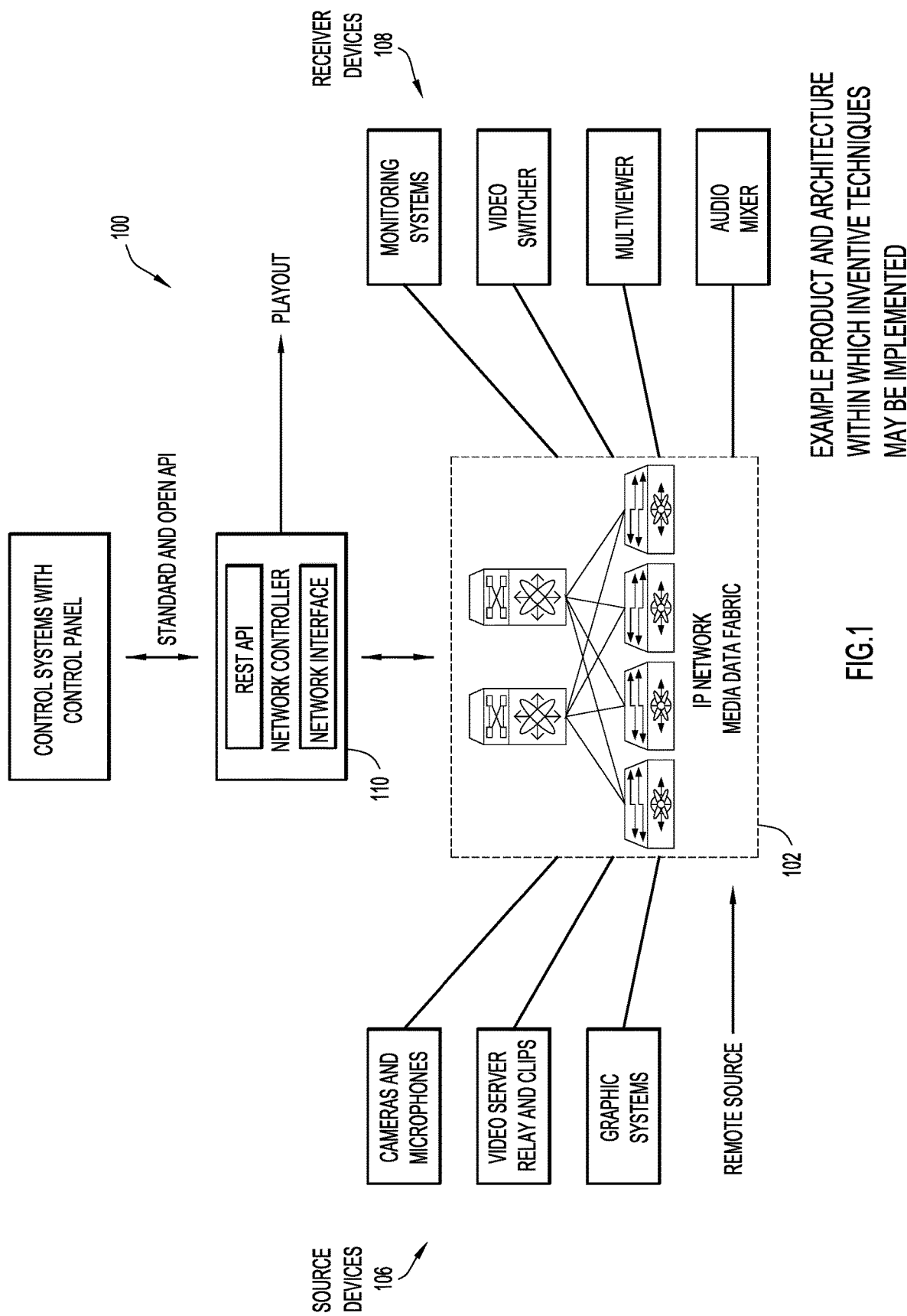
FIG. 1 is an illustrative representation of a system for use in delivering IP multicast media data with use of an IP network media data fabric, which is an example product within which at least some implementations of the present disclosure may be realized.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques involving a source-initiated distribution of spine node identifiers of preferred spine nodes for optimal path selection and efficient multicast traffic delivery are described herein.

First Set of Inventive Aspects of the Present Disclosure. According to the present disclosure, a router node may be configured for communication of multicast traffic in a network fabric which may include a plurality of spine nodes interconnected to a plurality of leaf nodes.

In one illustrative example according to a first set of inventive aspects, the router node may be configured as one of the leaf nodes and serve as a first hop router (FHR) for multicast traffic. At the router node (e.g. the FHR), a message for flooding the network fabric may be sent based on an indication of communication of multicast traffic for a multicast group from a source device. The message may include at least one spine node identifier of at least one preferred spine node joined to the multicast group at the router node. The message may be for indicating, to at least one of the leaf nodes, to prioritize joining to the multicast group at the at least one preferred spine node according to at least one spine node identifier (e.g. in response to a joining of a receiver device to the multicast group at the at least one leaf node). The multicast traffic for the multicast group may be forwarded from the router node to the at least one preferred spine node. The forwarding of the multicast traffic for the multicast group to the at least one preferred spine node may be for the communication of the multicast traffic for the multicast group to at least one leaf node that is joined to the multicast group at the at least one preferred spine node according to at least one spine node identifier.

A flooding mechanism may be used for communicating the message for flooding the network fabric. In some implementations, the flooding mechanism may be based on a Protocol Independent Multicast (PIM) Flooding Mechanism (PFM), where the message for flooding may be referred to as a PFM or PFM-type message. The at least one spine node identifier in the message may include a first spine node identifier which is included in the message as a type-length-value (TLV). The at least one spine node identifier may be a router node identifier, which may be or be based on a serial number, a Media Access Control (MAC) address, or a name of the router node, or any suitable type of identification. The message may further include at least one of a source address of the source device and a multicast group address of the multicast group for the multicast traffic.

In some implementations, at least one preferred spine node may be selected from the plurality of spine nodes according to a predetermined function. The predetermined function may be a selection function according to a link-based hash; a selection function for selecting one of the spine nodes with a link having a maximum bandwidth; a selection function for selecting one of the spine nodes based on a total bandwidth of links to some or all of the spine nodes; or a selection function based on a stored administrative configuration preference, as a few examples.

In some implementations, the message may comprise a list of two or more prioritized spine node identifiers which include a first spine node identifier and a second spine node identifier. The first spine node identifier may identify a first preferred spine node joined to the multicast group at the router node and the second spine node identifier may identify a second preferred spine node joined to the multicast group at the router node. The first preferred spine node may be associated with a first priority and the second preferred spine node may be associated with a second priority. In some implementations, the message may further include a first priority value associated with the first spine node identifier and a second priority value associated with the second spine node identifier. Here, the message may be for further indicating, to at least one of the leaf nodes, to prioritize joining, as a first priority according to the first priority value, to the multicast group at the first preferred spine node according to the first spine node identifier. In addition, the message may be for further indicating, to the at least one of the leaf nodes, to prioritize joining, as a second priority according to the second priority value, to the multicast group at the second preferred spine node according to the second spine node identifier.

In some implementations, the message may further include at least one excluded spine node identifier of at least one excluded spine node to be excluded from use or further use in the communication of the multicast traffic for the multicast group. Here, the message may be for further indicating, to at least one of the leaf nodes, to prohibit joining to the multicast group at the at least one excluded spine node according to the at least one excluded spine node identifier (e.g. in response to a joining of a receiver device to the multicast group at the at least one leaf node).

In another illustrative example according to the first set of inventive aspects, the router node may be configured as one of the leaf nodes and serve as a last hop router (LHR) for multicast traffic. At the router node (e.g. the LHR), a message which is flooded in the network fabric may be received. The message may be originated by an originating leaf node which is operative to forward multicast traffic for a multicast group from a source device. The message may include at least one spine node identifier of at least one preferred spine node joined to the multicast group at the originating leaf node. The router node may prioritize joining to the multicast group at the at least one preferred spine node according to the at least one spine node identifier. The prioritized joining to the multicast group may be performed in response to a joining of a receiver device to the multicast group at the router node.

In some implementations, the message which is flooded in the network fabric may be communicated based on an indication of communication of the multicast traffic for the multicast group from the source device at the originating leaf node. The message for flooding the network fabric may be communicated with use of a flooding mechanism. In some implementations, the flooding mechanism may be based on a PFM, where the message for flooding may be referred to as a PFM or PFM-type message. The at least one spine node identifier in the message may include a first node identifier which is included in the message as a TLV. The at least one spine node identifier may be a router node identifier, which may be or be based on a serial number, a MAC address, or a name of the router node, or any suitable identification. The message may further include at least one of a source address of the source device and a multicast group address of the multicast group for the multicast traffic.

In some implementations, the message may comprise a list of two or more prioritized spine node identifiers which include a first spine node identifier and a second spine node identifier. The first spine node identifier may identify a first preferred spine node joined to the multicast group at the router node and the second spine node identifier may identify a second preferred spine node joined to the multicast group at the router node. The first preferred spine node may be associated with a first priority and the second spine node may be associated with a second priority. In some implementations, the message may further include a first priority value associated with the first spine node identifier and a second priority value associated with the second spine node identifier. Here, the router node (e.g. the LHR) may prioritize joining, as a first priority according to the first priority value, to the multicast group at the first preferred spine node according to the first spine node identifier. Further, the router node may prioritize joining, as a second priority according to the second priority value, to the multicast group at the second preferred spine node according to the second spine node identifier. The prioritized joining to the multicast group may be performed in response to a joining of a receiver device to the multicast group at the router node.

In some implementations, the message may further include at least one excluded spine node identifier of at least one excluded spine node to be excluded from use or further use for receiving the multicast traffic for the multicast group. Here, the router node (e.g. the LHR) may refrain from joining the multicast group at the at least one excluded spine node according to the at least one excluded spine node identifier.

Second Set of Inventive Aspects of the Present Disclosure. In one illustrative example of a second set of inventive aspects, the router node configured as one of the leaf nodes may serve as an FHR for multicast traffic. At the router node (e.g. the FHR), a message for flooding the network fabric may be sent based on an indication of communication of multicast traffic for a multicast group from a source device. The message may include at least one excluded spine node identifier of at least one excluded spine node to be excluded from use or further use in the communication of the multicast traffic for the multicast group. The message may be for indicating, to at least one of the leaf nodes, to prohibit joining to the multicast group at the at least one excluded spine node according to the at least one excluded spine node identifier (e.g. in response to a joining of a receiver device to the multicast group at the at least one leaf node). The multicast traffic for the multicast group may be forwarded to a selected one of the spine nodes. In at least some cases, the router node may refrain from forwarding the multicast traffic for the multicast group to the at least one excluded spine node.

In some implementations, at least one of the spine nodes may be identified to be the at least one excluded spine node in response to an indication that the at least one spine node is being removed or upgraded. In some implementations, at least one of the spine nodes may be identified to be the at least one excluded spine node in response to an indication that a bandwidth limit of links to the at least one excluded spine node has been reached.

A flooding mechanism may be used in the communication of the message for flooding the network fabric. In some implementations, the flooding mechanism may be based on a PFM, where the message for flooding may be referred to as a PFM or PFM-type message. The at least one excluded spine node identifier in the message may include a first excluded spine node identifier which is included in the message as a TLV. The at least one excluded spine node identifier may be a router node identifier, which may be or be based on a serial number, a MAC address, or a name of the router node, or any suitable identification. The message may further include at least one of a source address of the source device and a multicast group address of the multicast group for the multicast traffic.

In another illustrative example according to the second set of inventive aspects, the router node configured as one of the leaf nodes may serve as a LHR for multicast traffic. At the router node (e.g. the LHR), a message which is flooded in the network fabric may be received. The message may be originated by an originating leaf node which is configured to forward multicast traffic for a multicast group from a source device. The message may include at least one excluded spine node identifier of at least one excluded spine node. At the router node, one of the spine nodes at which to join to the multicast group may be selected, excluding the at least one excluded spine node according to the at least one excluded spine node identifier. The router node may join the multicast group at the selected one of the spine nodes to receive the multicast traffic (e.g. in response to a joining of a receiver device to the multicast group at the router node).

In some implementations, the message which is flooded in the network fabric may be communicated based on an indication of communication of the multicast traffic for the multicast group from the source device at the originating leaf node. The message for flooding the network fabric may be communicated with use of a flooding mechanism. In some implementations, the flooding mechanism may be based on a PFM, where the message for flooding may be referred to as a PFM or PFM-type message. The at least one excluded spine node identifier in the message may include a first excluded spine node identifier which is included in the message as a TLV. The at least one excluded spine node identifier may be a router node identifier, which may be or be based on a serial number, a MAC address, or a name of the router node, or any suitable identification. The message may further include at least one of a source address of the source device and a multicast group address of the multicast group for the multicast traffic.

More detailed and alternative techniques and implementations are provided herein as described below.

Example Embodiments

IP multicast is a bandwidth-conserving technique that reduces traffic by simultaneously delivering a single stream of information to many (e.g. potentially thousands of) recipients. Applications that take advantage of multicast include video conferencing, corporate communications, distance learning, and distribution of software, stock quotes, and news, amongst many others. IP multicast delivers application source traffic to multiple receiver devices without burdening the source or the receiver devices, using a minimum amount of network bandwidth. Multicast packets are replicated in the network at the point where paths diverge by multicast-configured router nodes, resulting in an efficient delivery of data to multiple receiver devices.

Many alternatives to IP multicast require the source device to send more than one copy of the data. Some alternatives, such as application-level multicast, require the source device to send an individual copy to each receiver device. High-bandwidth applications, such as Motion Picture Experts Group (MPEG) video, may require a large portion of the available network bandwidth for a single stream. In these applications, IP multicast may be the (e.g. only) satisfactory way to send to more than one receiver devices simultaneously. Even low-bandwidth applications can benefit from IP multicast, for example, when there are thousands of receiver devices.

Multicast is based on the concept of a group. A multicast group may be an arbitrary group of receiver devices that expresses an interest in receiving a particular data stream. This group has no physical or geographical boundaries; the receiver devices may be located anywhere on the Internet or any private internetwork.

Multicast may rely on a group management protocol to establish and maintain local multicast group membership, as well as multicast routing protocols to route packets efficiently. For example, an Internet Group Management Protocol (IGMP) may be used to manage packet communication between receiver devices and their local multicast router node, allowing the receiver devices to join or leave groups. Examples of multicast protocols include Protocol Independent Multicast (PIM) Sparse Mode (PIM-SM) and PIM source specific multicast (PIM-SSM) routing protocols. These protocols are known and described in detail in *Protocol Independent Multicast-Sparse Mode (PIM-SM): Protocol Specification (Revised)*, Request for Comments (RFC)

4601, B. Fenner et al., August 2006; and *Internet Group Management Protocol, Version* 3, RFC 3376, Cain et al., October 2002. Each of the above documents is hereby incorporated by reference as though fully set forth herein.

In a typical scenario, receiver devices of a designated multicast group may be interested in receiving a video data stream from a particular source device. The source may communicate the video data to its directly-connected router (i.e. a first hop router or "FHR"). A receiver device may indicate its interest by sending an IGMP host report to router nodes in the network. The receiver device may also use IGMP to send a group membership message to its directly-connected router (i.e. a last hop router or "LHR"), indicating that it wants to join a particular group. The router nodes may use PIM to dynamically create a distribution tree, and deliver the video data from the source device to the receiver devices along the distribution tree. The video data stream will be delivered along network segments of the distribution tree between the source device and the receiver devices.

Multicast packets may be identified by a multicast group address in the destination address field of an IP header. Again, multicast routing protocols are used to construct the distribution trees through the network and direct multicast forwarding, defining the path that the multicast traffic will take through the network to its group members. The distribution trees may be source specific or shared distribution trees. A distribution tree is shared when any source device originating data traffic destined to a group address of a multicast group uses the same distribution tree to forward data to the receiver devices. On the other hand, a source distribution tree is a separate, shortest path tree (SPT) built for each source device originating traffic to a multicast group.

SPTs allow for the creation of an optimal path between the source device and the receiver devices. In at least many or most instances, this provides for a minimum amount of network latency in the forwarding multicast traffic. Here, the router nodes in the tree have to maintain path information for each source device in a multicast routing table. On the other hand, shared trees allow for a minimum or reduced amount of state to be maintained in each router node. This lowers the overall memory requirements in a network that allows for only shared trees. In shared trees, the paths between the source device and the receiver device may not always be optimal paths. This may introduce some latency in packet delivery.

A special notation of "(S, G)" may enumerate an SPT where S is the IP address of the source device and G is the multicast group address. The (S, G) notation implies that a separate SPT may exist for each individual source device sending to each group. Unlike source trees that have their root at the source device, shared trees use a single common root placed at some chosen point in the network (e.g. a rendezvous point or "RP"). When using a shared tree, source devices send their traffic to the root and then the traffic is forwarded down the shared tree to reach the receiver devices. Since all source devices in the multicast group use a common shared tree, a wildcard notation written as (*, G) may represent the tree. In this case, "*" means all sources and "G" represents the multicast group. Messages are replicated only where the tree branches.

At least in some configurations, multicast may be deployed on a computer network using a specific RP. This may be done in order to build a shared multicast distribution tree for a multicast group falling within a destination address prefix, or to build a separate shortest path tree for each source device originating traffic to the multicast group. An RP may be considered to be a specific router node that is designated as the root of a shared multicast distribution tree.

A router node may join a multicast group (distribution tree) towards the source or RP. The interface on the router node leading towards the source or RP may be referred to as an ingress interface. Depending upon the multicast routing protocol, there is usually only one ingress interface on the router node receiving multicast packets for a particular route. One or more interfaces on the router node leading towards the receiver devices may be referred to as egress interfaces. The receiver devices are leaves on the distribution tree. Packets are sent from a source to the root (source or RP) of the distribution tree, where they are forwarded towards the branches and out to the nodes that represent the receiver devices. On each node, packets are received on the ingress interface towards the root of the tree and packets are forwarded out egress interfaces towards the receiver devices.

In a multi-spine, Clos-based network, a network fabric may include a plurality of spine nodes interconnected to a plurality of leaf nodes. Here, each spine node may be configured as an RP for all of the multicast groups (i.e. Anycast RP). The spine nodes may have the same IP address configured on a loopback interface which is used by the leaf nodes as the RP address. Whenever a source device starts to send multicast traffic, the FHR may select one of the upstream links, and hence a corresponding spine node, via a hashing algorithm. The FHR may then send to the selected spine node a PIM register which triggers the creation of an (S, G) multicast route on that node. On the other hand, whenever a receiver device requests the same (S, G) multicast route, the LHR may also select one of the links, and hence a corresponding spine node, via the hashing algorithm. The LHR may then send to the selected spine node a PIM (S, G) Join which triggers the creation of an (S, G) multicast route. Since the spine node selection is performed separately and independently by each leaf node (whether the FHR or any of the LHRs) using local information, the FHR and LHRs may each end up selecting a different spine node for multicast traffic. This creates an inefficient, unnecessary replication of multicast traffic between the source and receiver devices.

The above-described approach may or may not create noticeable or significant problems depending on the application or industry. In a data center, for example, multicast flows are typically short-lived, low-bandwidth flows with links that are not abundantly utilized.

On the other hand, in the media and broadcast industry, the requirements are very different from (e.g. more strict than) typical multicast networks. Media traffic flows are typically User Datagram Protocol (UDP) Multicast. Although IGMP and PIM have been widely deployed to carry such multicast flows across bridged and routed networks, continuous, reliable traffic delivery may not always be achievable. Media traffic flows, which are numerous (e.g. a few thousand in number) and "elephant-like," may greatly benefit from the use of traffic engineering techniques for optimal path selection.

To better illustrate, FIG. 1 is an illustration of a system 100 for use in IP multicast delivery of media data using an IP network media data fabric 102. Video and/or audio signals may be communicated in system 100 with use of IP network media data fabric 102. As shown, a plurality of source devices 106 may connect to IP network media data fabric 102 to send media signals. Source devices 106 may include cameras and microphones, video server relay and clips, graphic systems, remote sources, television broadcast sources, and/or any other suitable source devices. A plurality of receiver devices 108 may connect to IP network media data fabric 102 to receive media signals from any one of the sources devices 106. As illustrated, receiver devices 108 may include monitoring systems, video switches, multi-viewers, audio mixers, and/or any other suitable receiver devices.

Again, IP network media data fabric 102 may be operative to provide IP multicast delivery of media data from source devices 106 to receiver devices 108. The source devices 106 may connect to IP network media data fabric 102 to send media data (e.g. video and/or audio data) via IP multicast delivery, and the receiver devices 108 may connect to IP network media data fabric 102 to receive the media data via IP multicast delivery from selected ones of sources devices 106. A network controller 110 may also be provided to interface with IP network media data fabric 102 via a network interface, for control by one or more control systems via an application programming interface (API) (e.g. a REST API).

In some preferred implementations, the IP network media data fabric 102 may be configured to provide for an IP multicast delivery of media data at a guaranteed (non-blocking) bandwidth, such as for video for live studio broadcast production. The system 100 of FIG. 1 may be referred to as an IP Fabric for Media solution.

Figure 2A:
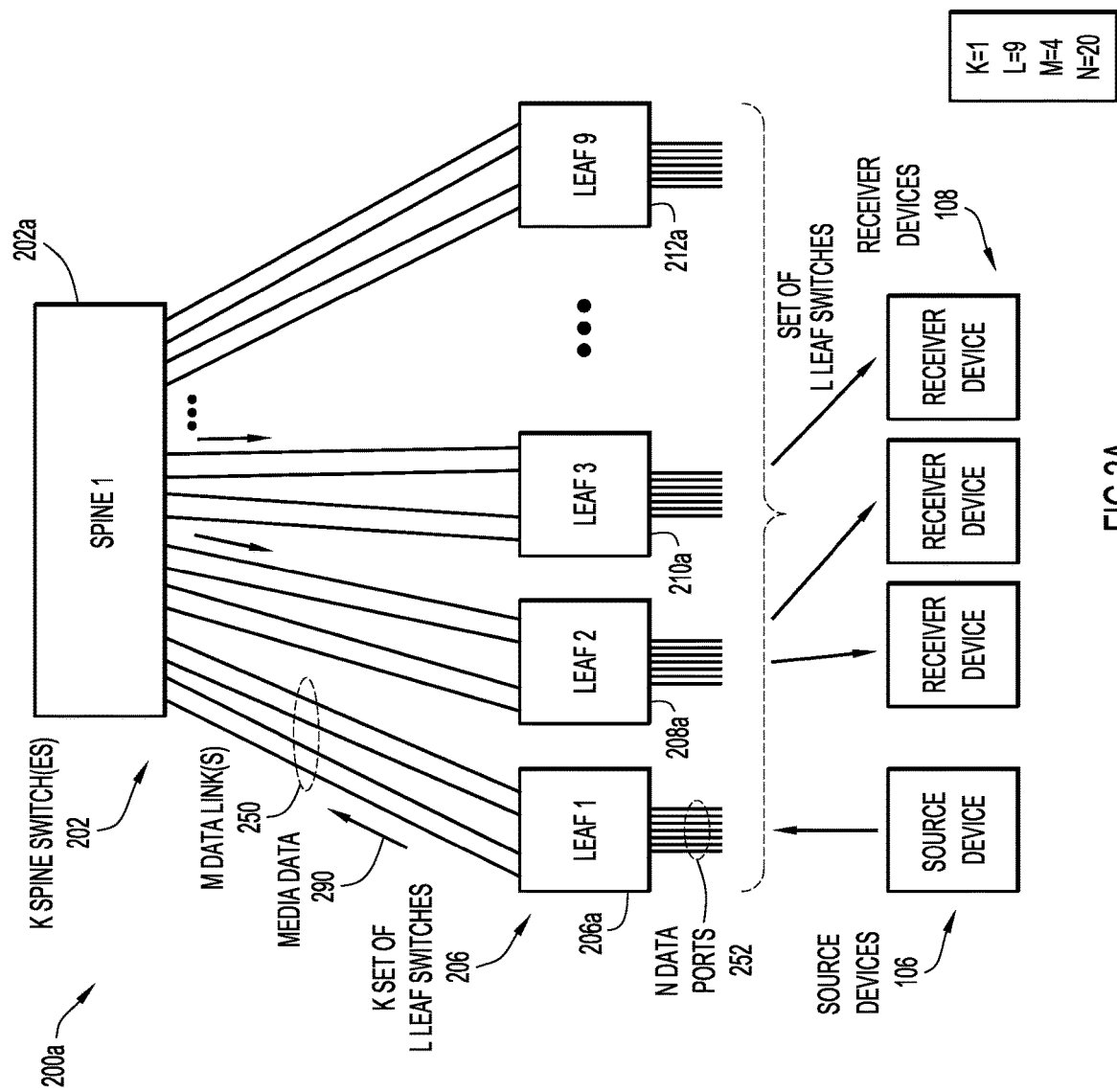
FIG. 2A is an illustration of an example of a spine and leaf architecture of the IP network media data fabric of FIG. 1, which is an example architecture within which at least some implementations of the present disclosure may be realized.

FIG. 2A is an illustration of one example of a spine and leaf switch architecture 200a which may be used in the IP network media data fabric 102 of FIG. 1. Spine and leaf switch architecture 200a of IP network media data fabric 102 of FIG. 2A is operative to provide IP multicast delivery of media data from source devices 106 to receiver devices 108. To provide IP multicast delivery, spine and leaf switch architecture 200a may operate with use of one or more multicast protocols, such as IGMP, PIM, and/or other suitable protocols.

Although a spine and leaf architecture is shown and described in the present disclosure, it is noted that such topology is used to provide merely an illustrative example topology within which techniques of the present disclosure may be utilized. Thus, implementations of the present disclosure may be applied to a network fabric having a plurality of router nodes connected in any suitable topology configuration, such as a single box topology, a mesh topology, a ring topology, etc.

As illustrated in FIG. 2A, spine and leaf switch architecture 200a may include K spine switches 202 (e.g. spine switch 402a), K sets of L leaf switches 206 (e.g. leaf switches 206a, 208a, 210a, through 212a for a total of 9 leaf switches), M data links 250 between each leaf switch and each spine switch, and a plurality of bidirectional data ports 252 (i.e. for source and receiver connections) connected to each leaf switch. Each one of data links 250 may be provided or set with a maximum link bandwidth of $BW_L$. Source devices 106 and receiver devices 108 may connect to any of the bidirectional data ports 252 for the communication of media data. Although data ports 252 are bidirectional, their use in practice is highly asymmetrical (i.e. one-way, depending on whether the connected device is a source or a receiver). In actual practice, the number of receiver devices 108 connected to bidirectional data ports 252 may far exceed the number of source devices 106 connected to bidirectional data ports 252.

To illustrate the basic approach in FIG. 2A, one of source devices 106 may send media data through one of bidirectional data ports 252 of leaf switch 206a. An IP multicast of the media data (e.g. media data 290) may be sent from leaf switch 206a up to spine switch 202a, and then down to leaf switches 208a and 210a. Two of the receiver devices 108 may receive the media data via leaf switch 208a as shown, and another one of the receiver devices 108 may receive the media data via leaf switch 210a as shown.

In some implementations, the IP network media data fabric 102 may be provided and/or specified with a maximum number of the bidirectional data ports 252

$$N=(a/K) \times (BW_L/BW_P)$$

for a non-blocking IP multicast delivery of data at a maximum port bandwidth of $BW_P$, where "a" is a fixed constant greater than or equal to K. More specifically, the non-blocking of IP multicast delivery may be a guaranteed non-blocking IP multicast delivery. In some implementations, the IP network media data fabric 102 may have (e.g. exactly) N bidirectional data ports connected to each leaf switch as specified above. More generally, the number of bidirectional data ports provided for use in the IP network media data fabric 102 may be $N \leq (a/K) \times (BW_L/BW_P)$ for guaranteed non-blocking IP multicast delivery.

When the property or constraint of $N \leq (a/K) \times (BW_L/BW_P)$ is satisfied (i.e. the non-blocking feature is in effect), any or most any traffic flow pattern using source and receiver devices 106 and 108 connected to bidirectional data ports 252 may be achieved. When the property or constraint is violated (i.e. $N > (a/K) \times (BW_L/BW_P)$, the non-blocking aspect may not hold and is not guaranteed. Connectivity between source and receiver devices 106 and 108 may degrade gradually. Some of receiver devices 108 may not be able to receive their traffic flows, and this depends on the input traffic matrix, the position of the source and receiver devices in the network topology. Reviewing the mathematical expressions and relationships, IP network media data fabric 102 may be configured with the property of $M \times BW_L \geq N \times BW_P$. "M" may be a function of K, where $M=(a/K)$. Here, "a" is a special case of M where K=1. The fixed value of "a" may be any suitable number greater than K, such as any number greater than two (2), or for example $2 \leq K \leq 10$.

In FIG. 2A, it is shown that spine and leaf switch architecture 200a is configured such that K=1, L=9, M=4, and N=40. In addition, a=K×M=4. The bandwidth of a data link may be expressed in speed or bits per second (bps), such as Gigabits per second (Gbps). In this example, the maximum link bandwidth $BW_L$ of a data link may be provided or set to be 100 Gbps, the maximum port bandwidth $BW_P$ of a bidirectional data port may be provided or set to be 10 Gbps, and the IP network media data fabric of FIG. 2A may be provided or specified with a maximum of forty (40) bidirectional data ports 252 that may be used for (guaranteed) non-blocking IP multicast delivery of data at a maximum port bandwidth of $BW_P$.

Figure 2B:
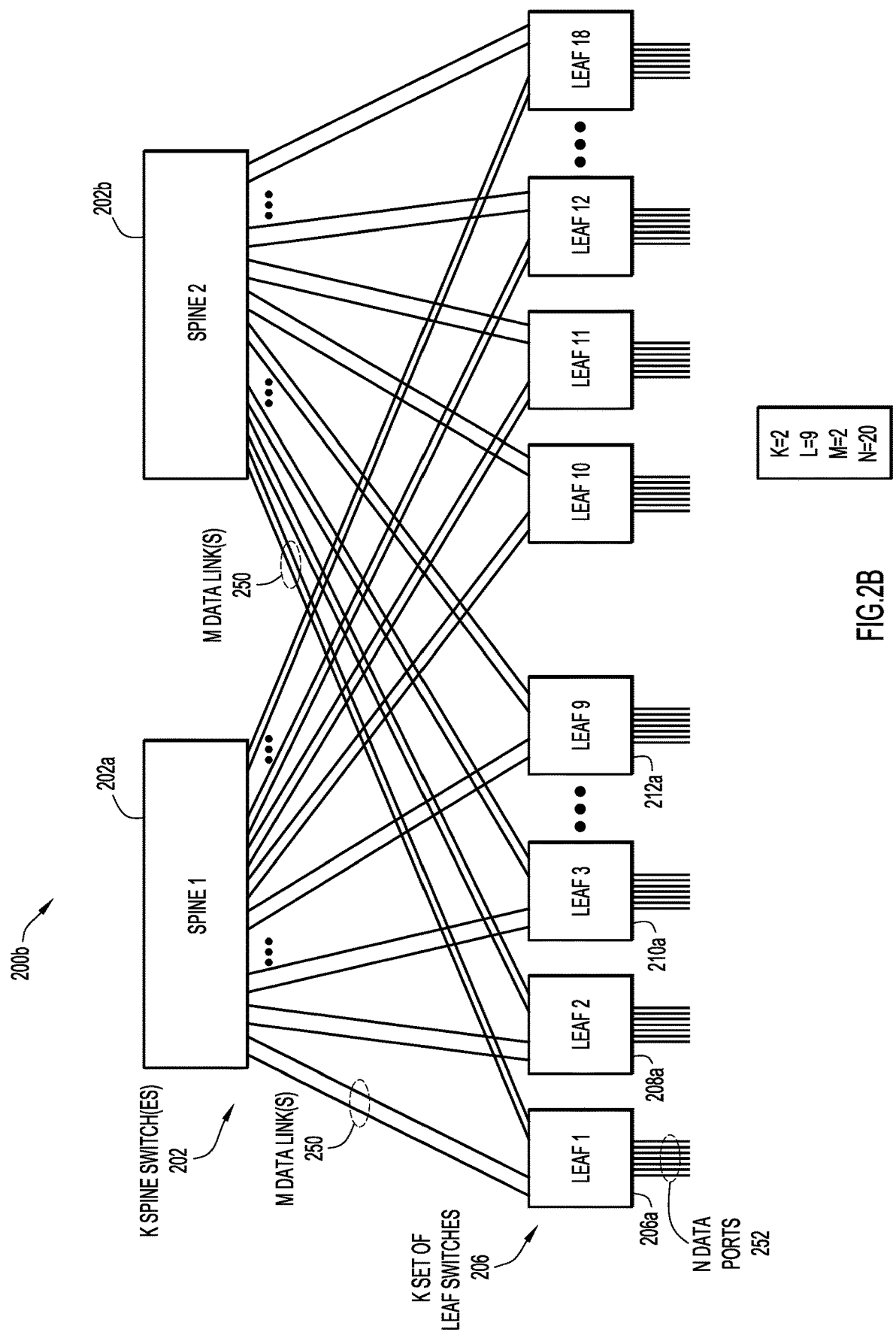
FIG. 2B is an illustration of another example of a spine and leaf architecture of the IP network media data fabric of FIG. 1, which is an example architecture within which at least some implementations of the present disclosure may be realized.

In some implementations, the spine and leaf switch architecture 200a may be reconfigurable and/or expandable to include C additional spine switches and C additional sets of L leaf switches (e.g. of the same or similar manufacture), e.g. for natural numbers of (K×M)/(K+C). To illustrate, FIG. 2B is an illustration of another example of a spine and leaf switch architecture 200b of IP network media data fabric 102. The spine and leaf switch architecture 200b of FIG. 2B may be substantially the same as or similar to the design of spine and leaf switch architecture 200a of FIG. 2A, except that the architecture has been reconfigured and/or expanded to include C additional spine switches (where C=1, for a total number of 2 spine switches) and C additional sets of L leaf switches (where C=1, for a total number of 2 sets of 9 leaf switches=18 leaf switches) as just previously described. Here, the maximum link bandwidth $BW_L$ of a data link may be maintained to be 100 Gbps, the maximum port bandwidth $BW_P$ of a bidirectional data port may be maintained to be 10 Gbps, and IP network media data fabric 102 of FIG. 2B may now be provided or specified with a new maximum number of twenty (20) bidirectional data ports 252 for (guaranteed) non-blocking IP multicast delivery of data at a maximum port bandwidth of $BW_P$.

Figure 3A:
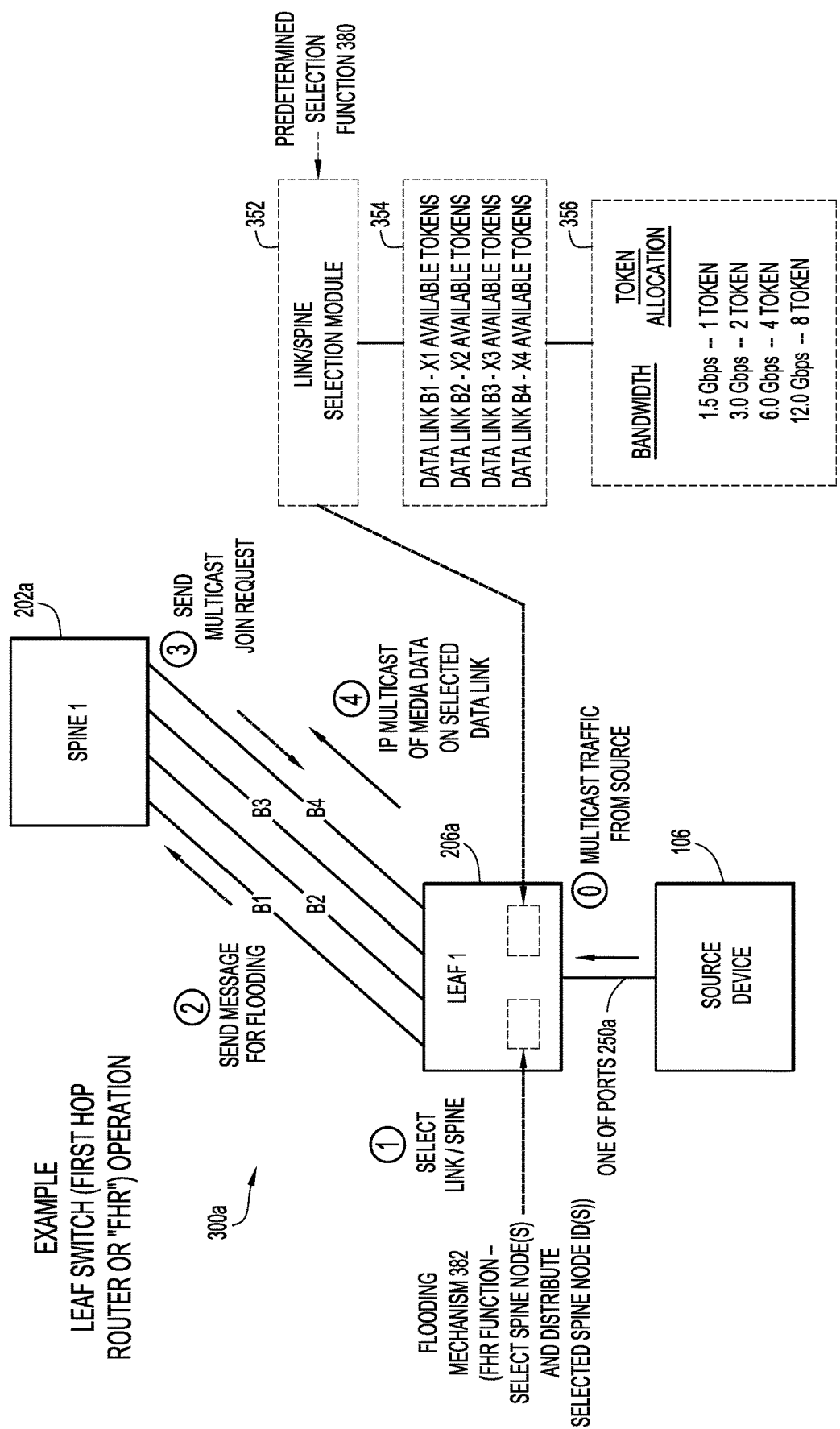
FIG. 3A is a flow diagram for describing a method of operation of a leaf switch as a first hop router (FHR) for multicast traffic in the IP network media data fabric of FIGS. 1, 2A and 2B.
Figure 3B:
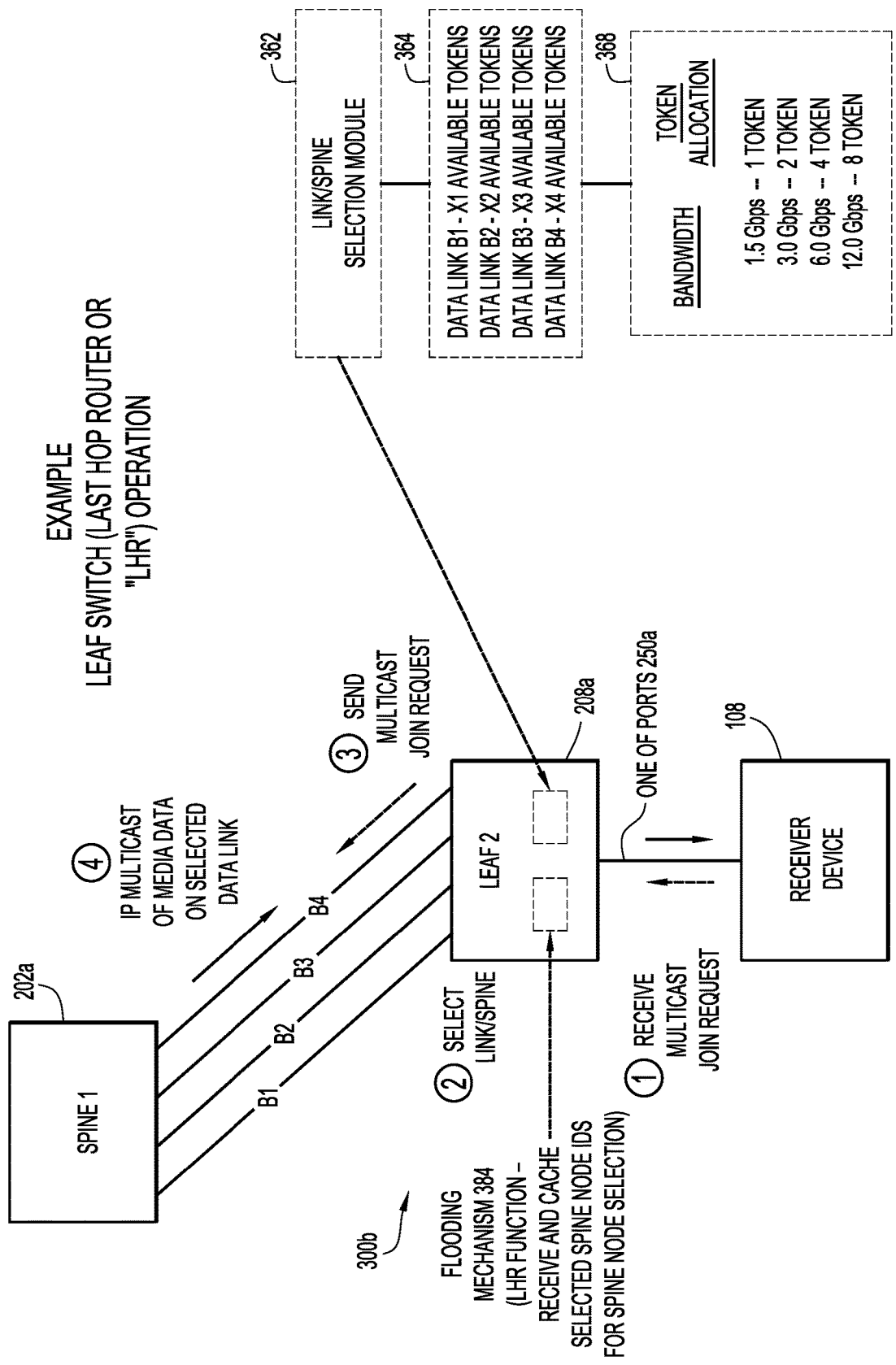
FIG. 3B is a flow diagram for describing a method of operation of a leaf switch as a last hop router (LHR) for multicast traffic in the IP network media data fabric of FIGS. 1, 2A and 2B.

The IP network media data fabric 102 of FIGS. 1, 2A, and/or 2B may operate according to the example operational description provided in relation to FIGS. 3A and 3B. This example operation which illustrates techniques of the present disclosure will be described in detail later below.

As previously described, traditional techniques for multicast path selection may result in unnecessary multicast traffic replication between source and receiver devices in the network fabric. In one approach to multicast path selection, the leaf nodes in the network fabric are configured to use a common hashing algorithm. In some instances, the hashing algorithm involves a sorting of spine node identifiers and an election of a "home" spine node based on a hash of S, G modulo the total number of spine nodes. Here, each leaf node performs a local calculation using locally-known information. This information may vary at any given time. For example, the total number of spine nodes and the list of available spine nodes may vary based on "link down" events or spine node "reloads." Thus, the hashing at each leaf node may result in the selection of a spine node that is different from the home spine node, resulting in unnecessary multicast traffic replication.

Figure 9:
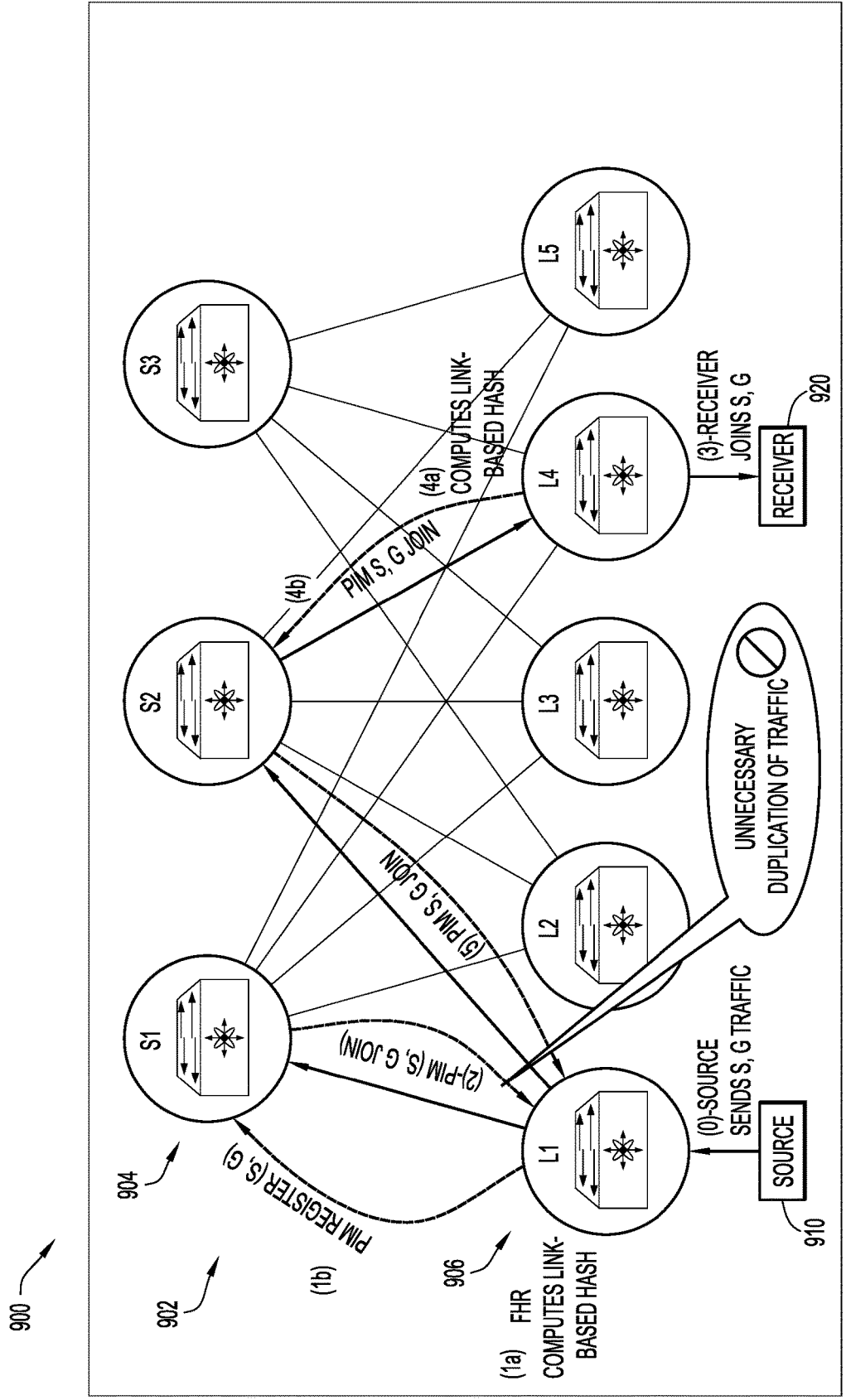
FIG. 9 is a flow diagram for an example flow for multicast path selection without use of inventive techniques of the present disclosure.

To better illustrate with reference ahead to FIG. 9, what is shown is a flow diagram 900 of an example flow for multicast path selection without use of inventive techniques of the present disclosure. The example flow is illustrated in relation to a network fabric 902 which includes a plurality of spine nodes 904 interconnected to a plurality of leaf nodes 906 in a spine and leaf architecture. As illustrated, spine nodes 904 include spine nodes S1, S2, and S3 and leaf nodes 906 include L1, L2, L3, L4, and L5. Each one of leaf nodes 906 is connected to each one of the spine nodes 904 via one or more links.

In FIG. 9, a source device 910 at L1 (e.g. an FHR) may be a source of multicast traffic associated with a multicast group. Source device 910 may begin to communicate multicast traffic to L1 (e.g. the FHR) (step 0 of FIG. 9). L1 may detect this multicast traffic and begin to build a multicast tree by selecting a link to one of the spine nodes 904. The link to one of the spine nodes 904 is selected by computing a link-based hash with use of local information (step 1a of FIG. 9). In the present example, the computation of the link-based hash causes L1 to select a link to S1. L1 may then send a PIM register to the selected spine node (i.e. S1) (step 1b of FIG. 9). In response, S1 may send a PIM Join to L1 for joining the multicast group (step 2 of FIG. 9).

On the other hand, a receiver device 920 at L4 (e.g. a LHR) may be an intended recipient of the multicast traffic from the source device 910. Receiver device 920 may send a PIM Join to L4 (e.g., its LHR) for joining the multicast group (step 3 of FIG. 9). In response, L4 may compute a link-based hash with use of local information for selecting a link to one of spine nodes 904 (step 4a of FIG. 9). In the present example, the computation of the link-based hash causes L4 to select a link to S2 (i.e. a different spine node than S1). L4 may then send a PIM Join to S2 (step 4b of FIG. 9) and, in turn, S2 may send a PIM Join to L1 (e.g. the FHR) (step 5 of FIG. 9). As is apparent, the hashing algorithms performed at each node result in the selection of different spine nodes (i.e. S1 and S2), further resulting in unnecessary multicast traffic duplication.

Again, with use of traditional techniques, different spine nodes may be selected based on different computational results of a hash algorithm which is performed separately and independently at each node. This sub-optimal path selection is at least one of the reasons for unnecessary replication of multicast traffic between source and receiver devices in network fabrics. Such unnecessary traffic duplication may occur especially after network triggers and the like (e.g. node "reloads," etc.). Further, when such hashing algorithms are utilized, there is little or no way to logically influence the path selection. Hashing algorithms may use parameters that are locally-known, providing for a localized decision that cannot be influenced. This means that if, for example, an FHR has insufficient bandwidth toward a spine node that is selected by a hashing algorithm, the FHR will still send a PIM Register to the selected spine node to create the route at that node. At the same time, each leaf node may send a PIM Join to the spine node that cannot be serviced by the FHR.

Even further, with use of traditional techniques, there is no way to perform a progressive or graceful removal of a spine node from the network fabric without an undesirable interruption. In the media and broadcast industry, operators may have shows that are broadcasted at any time of the day and last for several hours, and these shows are not allowed to have any interruptions. Although leaf nodes may be easily upgraded in or removed from the network fabric whenever there is no sender or receiver device on that particular leaf node, an upgrade or removal of a spine node poses significant problems because of a potential interruption. Traditional Graceful Insertion and Removal (GIR) cannot be used for spine node removal as it still creates a disruption in traffic streams that are present in the network.

According to at least some implementations of the present disclosure, techniques involving a source-initiated distribution of one or more spine node identifiers of one or more preferred spine nodes for use in multicast path selection are described. The multicast path selection may be an optimal multicast path selection for efficient multicast traffic delivery (e.g. for reducing or eliminating unnecessary traffic replication between source and receiver devices). The FHR may select the one or more spine nodes and propagate the spine node identifiers throughout the network, to be learned by other nodes (e.g. the LHRs) for a more optimal path selection. A flooding mechanism for use in source discovery may be further used for distributing a list of the one or more spine node identifiers which identify spine nodes that the LHRs should use for spine selection. In some implementations, the flooding mechanism for use in source discovery may be further used for distributing one or more excluded spine node identifiers which identify spine nodes that the LHRs should avoid or not use.

Figure 4A:
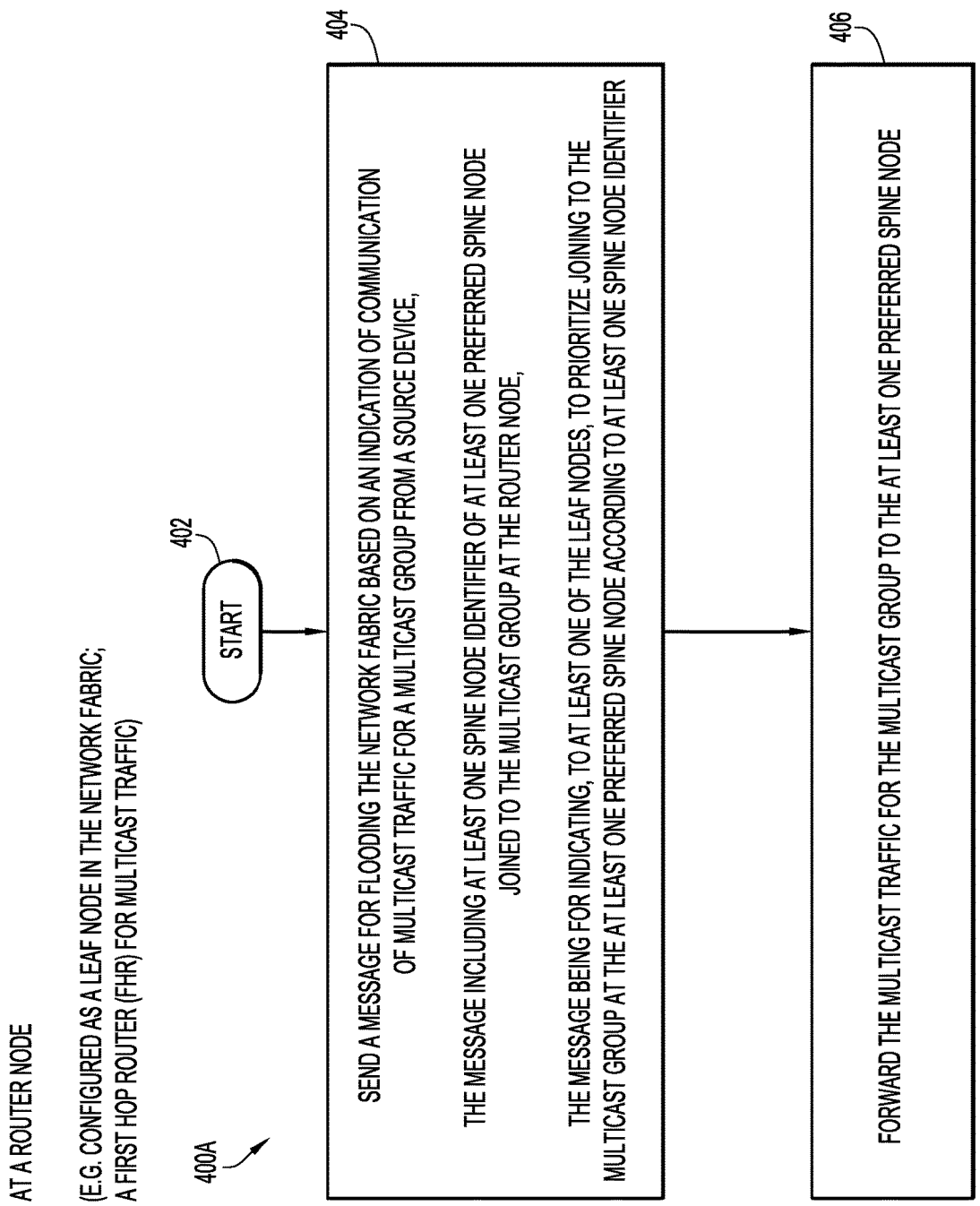
FIG. 4A is a flowchart of a method for use in multicast path selection according to some implementations of the present disclosure, applicable to an FHR for multicast traffic and relating to the first set of inventive aspects of the present disclosure.

Referring now to FIG. 4A, a flowchart 400A of a method for use in multicast path selection according to some implementations of the present disclosure is shown. The method of FIG. 4A relates to the first set of inventive aspects of the present disclosure. In at least some implementations, the method may involve a source-initiated distribution of one or more spine node identifiers for use in efficient and optimal multicast path selection (e.g. for reduced multicast traffic replication between source and receiver devices). The method may be performed by a router node which is configured for communication of multicast traffic in a network fabric which may include a plurality of spine nodes interconnected to a plurality of leaf nodes. In the method of FIG. 4A, the router node may be configured as one of the leaf nodes and serve as an FHR for multicast traffic. The method may be embodied as a computer program product including a non-transitory computer readable medium and instructions stored in the computer readable medium, where the instructions are executable on one or more processors of the router node for performing the steps of the method.

Beginning at a start block 402 of FIG. 4A, a message for flooding the network fabric may be sent based on an indication of communication of multicast traffic for a multicast group from a source device (step 404 of FIG. 4A). The message may include at least one spine node identifier of at least one preferred spine node joined to the multicast group at the router node. The message may be for indicating, to at least one of the leaf nodes, to prioritize joining to the multicast group at the at least one preferred spine node according to at least one spine node identifier. Thus, the at least one preferred spine node may be considered to be an "agreed-upon" spine node(s) at which to join the multicast group. The prioritized joining may be performed in response to a joining of a receiver device to the multicast group at the at least one leaf node. The multicast traffic for the multicast group may be forwarded from the router node to the at least one preferred spine node (step 406 of FIG. 4A). The forwarding of the multicast traffic for the multicast group to the at least one preferred spine node may be for the communication of the multicast traffic for the multicast group to at least one leaf node that is joined to the multicast group at the at least one preferred spine node according to at least one spine node identifier.

In step 404, a flooding mechanism may be used for communicating the message for flooding the network fabric. In some implementations, the flooding mechanism may be based on a PIM Flooding Mechanism (PFM). More specifically, the mechanism may be compatible with, based on, and/or an extension of *PIM Flooding Mechanism (PFM) and Source Discovery (SD)*, Internet Engineering Task Force (IETF), Request for Comments: 8364, I J. Wijnands et al., March 2018, which is hereby incorporated by reference as though fully set forth herein. Here, the message for flooding the network fabric may be based on and/or an extension of a PFM or PFM-SD message.

FIG. 4B is a flowchart 400B of a method for use in multicast path selection according to some implementations of the present disclosure. The method of FIG. 4B relates again to the first set of inventive aspects of the present disclosure. In at least some implementations, the method may involve a source-initiated distribution of one or more spine node identifiers for use in efficient and optimal multicast path selection (e.g. for reduced multicast traffic replication between source and receiver devices). The method may be performed by a router node which is configured for communication of multicast traffic in a network fabric which may include a plurality of spine nodes interconnected to a plurality of leaf nodes. In the method of FIG. 4B, the router node may be configured as one of the leaf nodes and serve as an LHR for multicast traffic. The method may be embodied as a computer program product including a non-transitory computer readable medium and instructions stored in the computer readable medium, where the instructions are executable on one or more processors of the router node for performing the steps of the method.

Beginning at a start block 412 of FIG. 4B, a message which is flooded in the network fabric may be received (step 414 of FIG. 4B). The message may be originated by an originating leaf node which is configured to forward multicast traffic for a multicast group from a source device. The message may include at least one spine node identifier of at least one preferred spine node joined to the multicast group at the originating leaf node. Upon receipt of the message, the router node may store or cache the at least one spine node identifier (e.g. in relation to the multicast source and/or group) for subsequent use. Subsequently, the router node may prioritize joining to the multicast group at the at least one preferred spine node according to the at least one spine node identifier (step 416 of FIG. 4B). The prioritized joining to the multicast group at the at least one preferred spine node may be performed in response to a joining of a receiver device to the multicast group at the router node. Thus, the at least one preferred spine node may be considered to be an "agreed-upon" spine node(s) at which to join the multicast group.

In some implementations, the message which is flooded in the network fabric may be sent from the originating leaf node based on an indication of communication of the multicast traffic for the multicast group from the source device at the originating leaf node. In step 414, a flooding mechanism may be used for communicating the message. In some implementations, the flooding mechanism may be based on the PFM. More specifically, the mechanism may be compatible with, based on, and/or an extension of the PFM and SD mechanism described in RFC 8364. Here, the message which is flooded in the network fabric may be based on and/or an extension of a PFM or PFM-SD message.

FIG. 5A is an illustrative example of a message 500A for flooding a network fabric according to some implementations of the present disclosure. The message 500A of FIG. 5A relates to the first set of inventive aspects of the present disclosure. In some implementations, the message 500A of FIG. 5A may be a PFM message per RFC 8364 with modifications and/or additions made as described herein. In FIG. 5A, message 500A includes a plurality of data fields which indicate a source device identifier 502 and a multicast group identifier 504. Source device identifier 502 is for identifying a source device which is the source of multicast traffic. Multicast group identifier 504 is for identifying a multicast group associated with the multicast traffic from the source device.

Message 500A may also include a spine node identifier 510. The spine node identifier 510 is for identifying a preferred spine node joined to the multicast group at the router node (e.g. the FHR). Message 500A may indicate, to at least one of the leaf nodes in the network fabric, to prioritize joining to the multicast group at the preferred spine node according to the spine node identifier. Thus, the spine node identifier 510 may be considered to be an "agreed-upon" spine node at which to join the multicast group. The spine node identifier 510 may be a router node identifier, which may be or be based on a serial number, a Media Access Control (MAC) address, or a name of the router node, or any suitable type of identification. The spine node identifier 510 may be included in the message 500A as a TLV. The TLV for the spine node identifier 510 may be associated with a unique, predetermined "type" value.

In some implementations, the message for flooding the network fabric may comprise a list of two or more prioritized spine node identifiers. To better illustrate, FIG. 5B is an illustrative example of a message 500B for flooding a network fabric according to some implementations (e.g. relating to the first set of inventive aspects of the present disclosure). Message 500B of FIG. 5B is the same or similar to message 500A of FIG. 5A, but has a list of two or more prioritized spine node identifiers which includes spine node identifier 510 and a spine node identifier 514. The message 500B may be said to include a prioritized list or a preferred list. Spine node identifier 510 may identify a first preferred spine node joined to the multicast group at the router node (e.g. the FHR) and the spine node identifier 514 may identify a second preferred spine node joined to the multicast group at the router node (e.g. the FHR). Thus, the spine node identifiers 510 and 514 may be considered to be "agreed-upon" spine nodes at which to join the multicast group. The first preferred spine node may be associated with a first priority and the second preferred spine node may be associated with a second priority (e.g. in an implicit prioritization of spine nodes). Here, each TLV for each spine node identifier may be associated with the same unique, predetermined "type" value.

In some implementations, the message for flooding the network fabric may further include two or more priority values associated the list of spine node identifiers (i.e. in an explicit prioritization of spine nodes). To better illustrate in relation to FIG. 5B, message 500B includes a value 512="Priority 1" which is associated with spine node identifier 510, and a value 516="Priority 2" which is associated with spine node identifier 514. As indicated, each spine node identifier and its associated priority value may be provided as a pairing. Here, each pairing of spine node identifier and associated priority value may be included in the message 500B as a TLV, and each one of these pairings in the message 500B may be associated with the same unique, predetermined "type" value.

In such implementations, message 500B may be for further indicating, to at least one of the leaf nodes in the network fabric, to prioritize joining, as a first priority according to value 512="Priority 1," to the multicast group at the first preferred spine node according to spine node identifier 510. In addition, the message 500B may be for further indicating, to the at least one of the leaf nodes in the network fabric, to prioritize joining, as a second priority according to value 514="Priority 2," to the multicast group at the second preferred spine node according to spine node identifier 514.

Thus, upon receiving and caching these data items in message 500B, a router node (e.g. one of the leaf nodes as the LHR) may prioritize joining, as a first priority according to value 512="Priority 1", to the multicast group at the first preferred spine node according to the spine node identifier 510. Further, the router node may prioritize joining, as a second priority according to value 516="Priority 2," to the multicast group at the second preferred spine node according to the spine node identifier 514. The prioritized joining to the multicast group may be performed in response to a joining of a receiver device to the multicast group at the router node. In one illustrative example, the router node may select the second preferred spine node over the first preferred spine node in response to identifying that the links to the first preferred spine node have insufficient bandwidth for the multicast traffic.

In some implementations, message 500A of FIG. 5A or message 500B of FIG. 5B may additionally include at least one excluded spine node identifier (not shown in FIG. 5A or 5B). The at least one excluded spine node identifier may be for identifying at least one excluded spine node to be excluded from (e.g. further) use in the communication of the multicast traffic for the multicast group. An excluded spine node identifier may be included in the message 500B as a TLV. The TLV for the excluded spine node identifier may be associated with a unique, predetermined "type" value (e.g. a value that is different from the predetermined type value for a preferred/prioritized spine node identifier). Here, the message may be for further indicating, to at least one of the leaf nodes, to prohibit joining to the multicast group at the at least one excluded spine node according to the at least one excluded spine node identifier (e.g. in response to a joining of a receiver device to the multicast group at the at least one leaf node). Thus, in response to receiving such a message, a router node (e.g. one of the leaf nodes as a LHR) may refrain from joining the multicast group at the at least one excluded spine node according to the at least one excluded spine node identifier.

Figure 6:
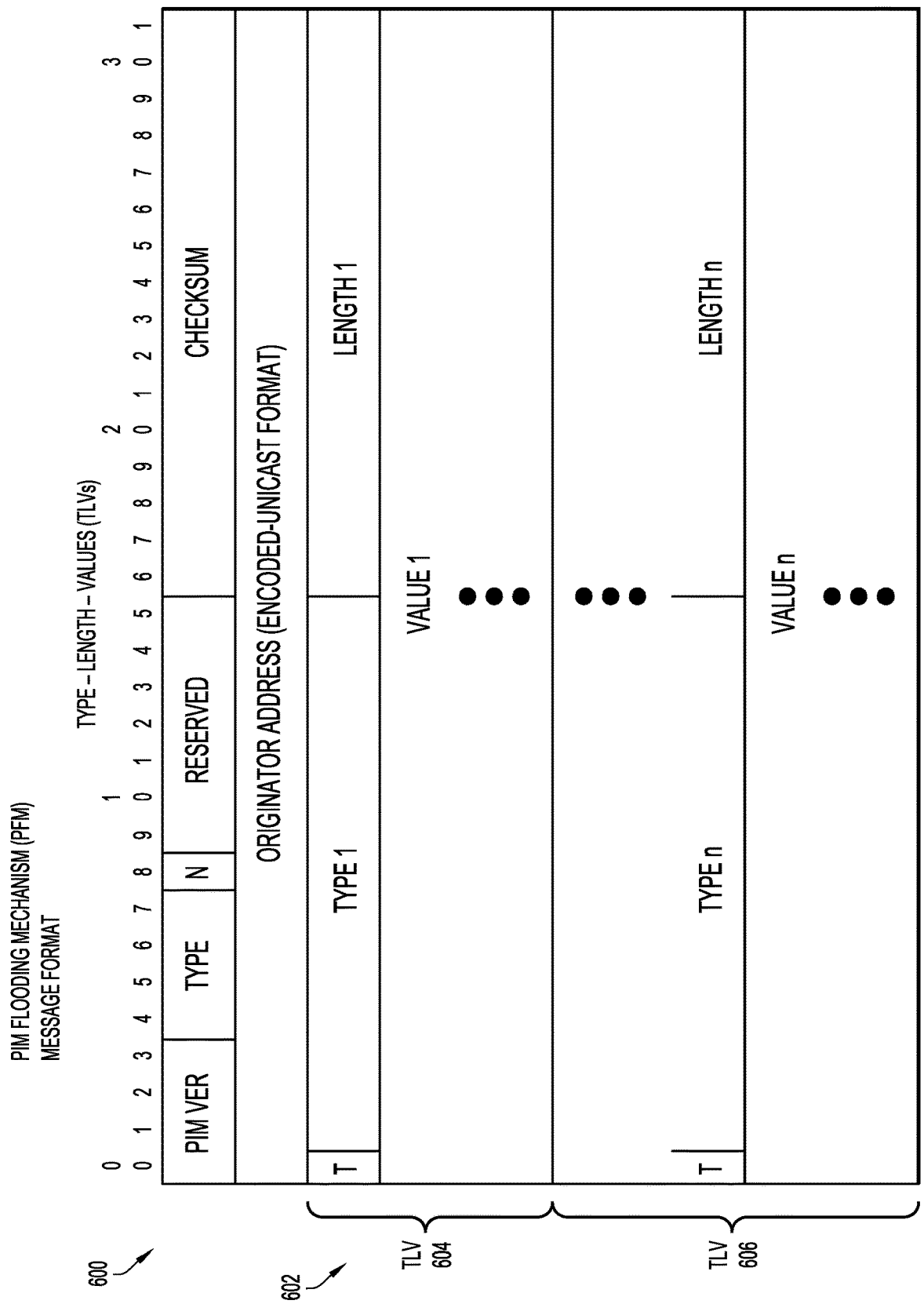
FIG. 6 is an illustrative example of a message format of a message for flooding the network fabric for multicast path selection, where the message includes one or more type-length-values (TLVs).

FIG. 6 is an illustrative example of a message format 600 of a message for flooding the network fabric (e.g. the PFM message) which includes one or more TLVs 602 (e.g. a TLV 604 and a TLV 606). The message format 600 of FIG. 6 may be used for the TLVs in the messages 500A and 500B of FIGS. 5A and 5B, respectively. As illustrated in FIG. 6, each TLV 602 includes a "type" value, a "length" value, and an actual data "value," where the "type" defines the type of data value and "length" indicates the (e.g. byte) length of the data value. Note that a PFM message may be registered in the PIM Message Types registry with a unique value (i.e. 12). In some implementations, the new type(s) of PFM TLV(s) may be registered in a registry created by the Internet Assigned Numbers Authority (IANA) referred to as "PIM Flooding Mechanism Message Types."

Figure 7A:
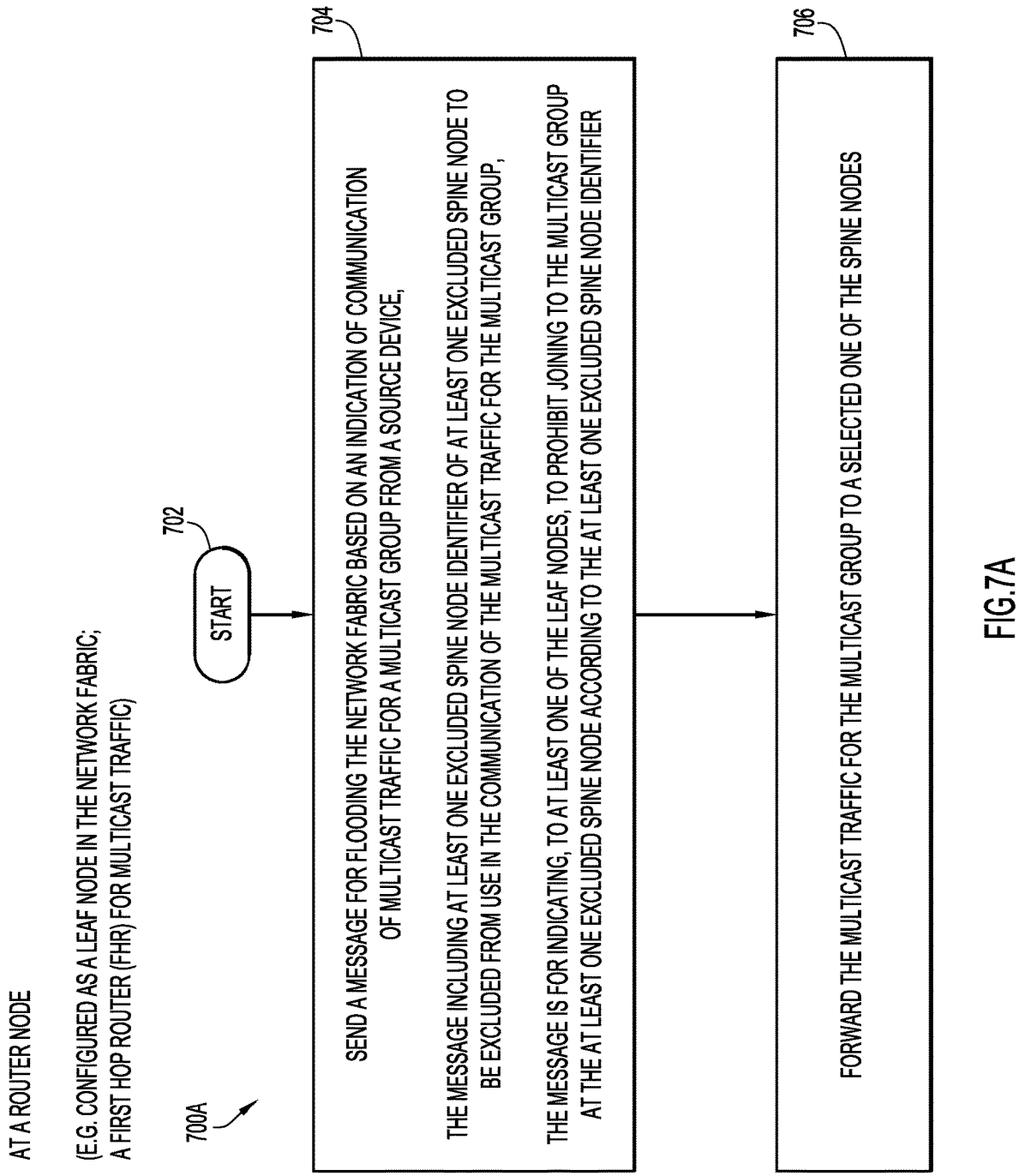
FIG. 7A is a flowchart of a method for use in multicast path selection according to some implementations of the present disclosure, applicable to an FHR for multicast traffic and relating to the second set of inventive aspects of the present disclosure.

FIG. 7A is a flowchart 700A of a method for use in multicast path selection according to some implementations of the present disclosure. The method of FIG. 7A relates to the second set of inventive aspects of the present disclosure. In at least some implementations, the method may involve a source-initiated distribution of one or more spine node identifiers for use in efficient and optimal multicast path selection. The method may be performed by a router node which is configured for communication of multicast traffic in a network fabric which may include a plurality of spine nodes interconnected to a plurality of leaf nodes. In the method of FIG. 7A, the router node may be configured as one of the leaf nodes and serve as an FHR for multicast traffic. The method may be embodied as a computer program product including a non-transitory computer readable medium and instructions stored in the computer readable medium, where the instructions are executable on one or more processors of the router node for performing the steps of the method.

Beginning at a start block 702 of FIG. 7A, a message for flooding the network fabric may be sent based on an indication of communication of multicast traffic for a multicast group from a source device (step 704 of FIG. 7A). The message may include at least one excluded spine node identifier of at least one excluded spine node to be excluded from use or further use in the communication of the multicast traffic for the multicast group. The message may be for indicating, to at least one of the leaf nodes, to prohibit joining to the multicast group at the at least one excluded spine node according to the at least one excluded spine node identifier. The multicast traffic for the multicast group may be forwarded to a selected one of the spine nodes (step 706 of FIG. 7A). In at least some cases, the router node (e.g. the FHR) may refrain from forwarding the multicast traffic for the multicast group to the at least one excluded spine node.

In some implementations, at least one of the spine nodes may be identified to be the at least one excluded spine node in response to an indication (e.g. received or detected at the router node or FHR) that the at least one spine node is being removed or upgraded. In some implementations, at least one of the spine nodes may be identified to be the at least one excluded spine node in response to an indication (e.g. received or detected at the router node or FHR) that a bandwidth limit of links to the at least one excluded spine node has been reached.

In step 704, a flooding mechanism may be used for communicating the message for flooding the network fabric. In some implementations, the flooding mechanism may be based on a PFM. More specifically, the mechanism may be compatible with, based on, and/or an extension of the PFM and SD mechanism described in RFC 8364. Here, the message for flooding the network fabric may be based on and/or an extension of a PFM or PFM-SD message. The at least one excluded spine node identifier in the message may include a first excluded spine node identifier which is included in the message as a TLV. The at least one excluded spine node identifier may be a router node identifier, which may be or be based on a serial number, a MAC address, or a name of the router node, or any suitable identification. The message may further include at least one of a source address of the source device and a multicast group address of the multicast group for the multicast traffic.

Figure 7B:
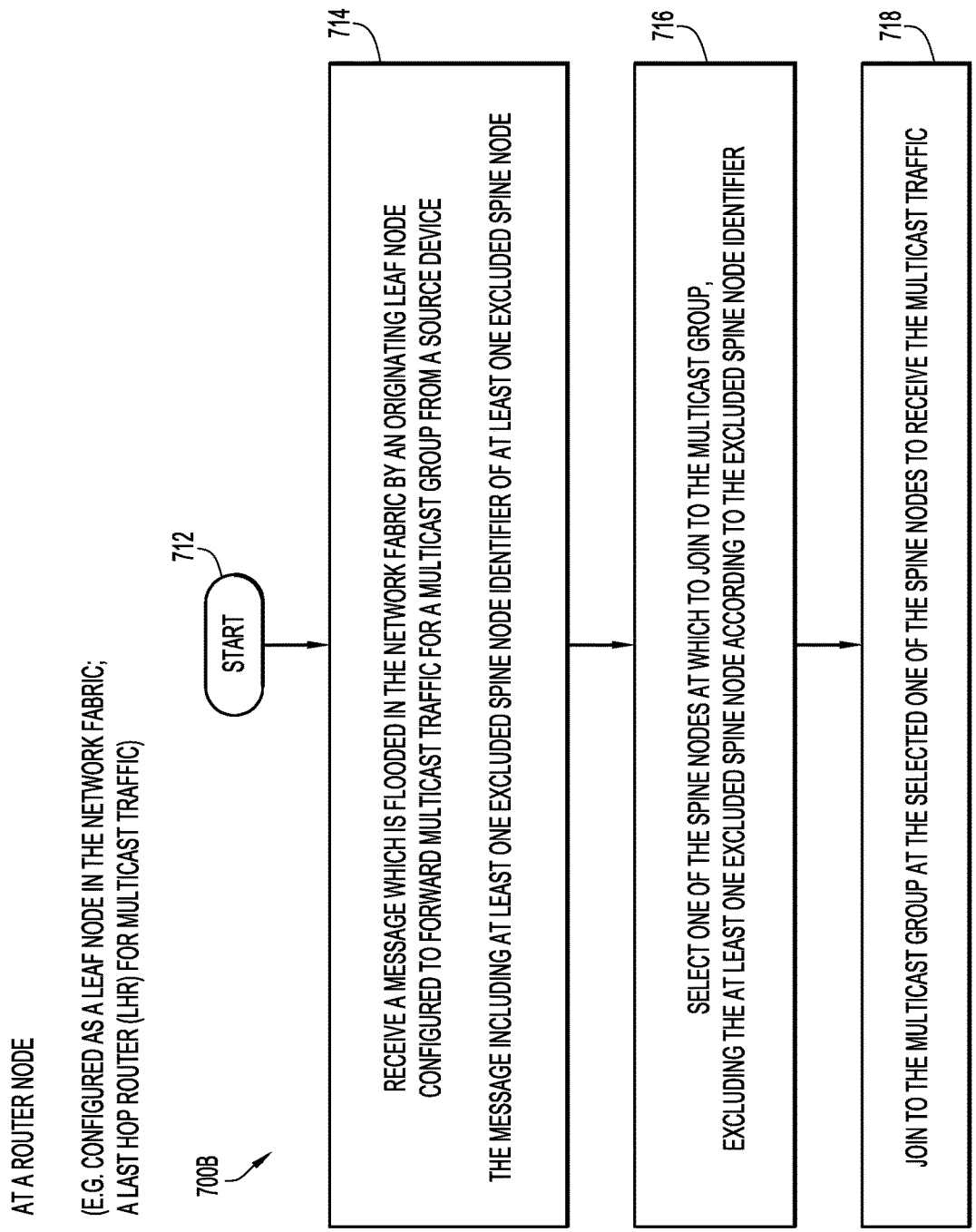
FIG. 7B is a flowchart of a method for use in multicast path selection according to some implementations of the present disclosure, applicable to a LHR for multicast traffic and relating to the second set of inventive aspects of the present disclosure.

FIG. 7B is a flowchart 700B of a method for use in multicast path selection according to some implementations of the present disclosure. The method of FIG. 7B relates to the second set of inventive aspects of the present disclosure. In at least some implementations, the method may involve a source-initiated distribution of one or more spine node identifiers for use in efficient and optimal multicast path selection. The method may be performed by a router node which is configured for communication of multicast traffic in a network fabric which may include a plurality of spine nodes interconnected to a plurality of leaf nodes. In the method of FIG. 7B, the router node may be configured as one of the leaf nodes and serve as a LHR for multicast traffic. The method may be embodied as a computer program product including a non-transitory computer readable medium and instructions stored in the computer readable medium, where the instructions are executable on one or more processors of the router node for performing the steps of the method.

Beginning at a start block 712 of FIG. 7B, a message which is flooded in the network fabric may be received (step 714 of FIG. 7B). The message may be originated by an originating leaf node which is configured to forward multicast traffic for a multicast group from a source device. The message may include at least one excluded spine node identifier of at least one excluded spine node. At the router node, one of the spine nodes at which to join to the multicast group may be selected, excluding the at least one excluded spine node according to the at least one excluded spine node identifier (step 716 of FIG. 7B). The router node may join the multicast group at the selected one of the spine nodes to receive the multicast traffic (step 718 of FIG. 7B). The joining may be performed in response to a joining of a receiver device to the multicast group at the router node.

In step 714, the message which is flooded in the network fabric may be sent from the originating leaf node based on an indication of communication of the multicast traffic for the multicast group from the source device at the originating leaf node. Also, a flooding mechanism may be used for communicating the message. In some implementations, the flooding mechanism may be based on a PFM. More specifically, the mechanism may be compatible with, based on, and/or an extension of the PFM and SD mechanism described in RFC 8364. Here, the message which is flooded in the network fabric may be based on and/or an extension of a PFM or PFM-SD message. The at least one excluded spine node identifier in the message may include a first excluded spine node identifier which is included in the message as a TLV. The at least one excluded spine node identifier may be a router node identifier, which may be or be based on a serial number, a MAC address, or a name of the router node, or any suitable identification. The message may further include at least one of a source address of the source device and a multicast group address of the multicast group for the multicast traffic.

FIG. 8A is an illustrative example of a message 800A for flooding a network fabric according to some implementations of the present disclosure. The message 800A of FIG. 8A relates to the first set of inventive aspects of the present disclosure. In some implementations, the message 800A of FIG. 8A may be a PFM message per RFC 8364 with modifications and/or additions made as described herein. In FIG. 8A, message 800A includes a plurality of data fields which indicate a source device identifier 802 and a multicast group identifier 804. Source device identifier 802 is for identifying a source device which is the source of multicast traffic. Multicast group identifier 804 is for identifying a multicast group associated with the multicast traffic from the source device.

Message 800A may also include an excluded spine node identifier 810. The excluded spine node identifier 810 is for identifying an excluded spine node to be excluded from (e.g., further) use in the communication of the multicast traffic for the multicast group. Here, message 800A may be for indicating, to at least one of the leaf nodes in the network fabric, to prohibit joining to the multicast group at the excluded spine node according to the excluded spine node identifier (e.g. in response to a joining of a receiver device to the multicast group at the at least one leaf node). The excluded spine node identifier 810 may be a router node identifier, which may be or be based on a serial number, a MAC address, or a name of the router node, or any suitable type of identification. The excluded spine node identifier 810 may be included in the message 800A as a TLV. The TLV for the excluded spine node identifier 810 may be associated with a unique, predetermined "type" value.

In some implementations, the message for flooding the network fabric may comprise a list of two or more excluded spine node identifiers. To better illustrate, FIG. 8B is an illustrative example of a message 800B for flooding a network fabric according to some implementations (e.g. relating to the second set of inventive aspects of the present disclosure). Message 800B of FIG. 8B is the same or similar to message 800A of FIG. 8A, but has a list of two or more excluded spine node identifiers which includes excluded spine node identifier 810 and an excluded spine node identifier 812. The message 800B may be said to include a denied list or a prohibited list. Excluded spine node identifier 810 may identify a first excluded spine node to be excluded from (e.g. further) use in the communication of the multicast traffic for the multicast group, and the excluded spine node identifier 814 may identify a second excluded spine node to be excluded from (e.g. further) use in the communication of the multicast traffic for the multicast group. Here, each TLV for each excluded spine node identifier may be associated with the same unique, predetermined "type" value. Again, note that a PFM message may be registered in the PIM Message Types registry with a unique value (i.e. 12). In some implementations, the new type(s) of PFM TLV(s) may be registered in the registry created by the IANA referred to as "PIM Flooding Mechanism Message Types."

As described earlier, a spine node may be identified to be an excluded spine node in response to an indication that the spine node is being removed or upgraded. With use of the above-described inventive techniques (e.g. FIGS. 7A and 7B and 8A and 8B) when a downtime of a spine node is planned, current flows may be serviced until completion but new flows may be prevented from using that spine node. Once all the flows on the spine node are finished, the spine node remains clear of flows for the upgrade or removal.

In at least some implementations, the above-described techniques of FIGS. 4A-4B, FIGS. 5A-5B, 6, FIGS. 7A-7B, and 8A-8B may be performed without use of (the previously-described) hashing algorithms as the preferred method to select upstream spine nodes.

Now, reference is made to FIGS. 10A-10E which are flow diagrams 1000A-1000E associated with an example flow for multicast path selection with use of inventive techniques of the present disclosure. Again, in at least some implementations, the method may involve a source-initiated distribution of one or more spine node identifiers for use in efficient and optimal multicast path selection (e.g. for reduced multicast traffic replication between source and receiver devices). In FIGS. 10A-10E, a network or a network fabric 1002 of the illustrative example may include a plurality of spine nodes 1004 interconnected to a plurality of leaf nodes 1006. As illustrated, spine nodes 1004 include spine nodes S1, S2, and S3 and leaf nodes 1006 include L1, L2, L3, L4, and L5. Each one of leaf nodes 1006 is connected to each one of the spine nodes 1004 in a spine and leaf node architecture.

In one illustrative scenario, a source device may begin to communicate multicast traffic to a leaf node (e.g. a FHR) and the leaf node may respond by sending a message for flooding the network fabric. The message may include at least one spine node identifier of at least one preferred spine node joined to the multicast group at the router node. The message may be for indicating, to at least one of the leaf nodes (e.g. an LHR), to prioritize joining to the multicast group at the at least one preferred spine node according to at least one spine node identifier. The at least one leaf node may store or cache the at least one spine node identifier (e.g. in relation to the multicast source and/or group) for subsequent use. Subsequently, a leaf node (e.g. the LHR) may receive a join of a receiver device to the multicast group and, in response, join the multicast group at a prioritized spine node according to the at least one spine node identifier.

In another illustrative scenario, a receiver device may join a multicast group at a leaf node (e.g. an LHR) in order to receive multicast traffic, even before the source device begins to send the multicast traffic. This is the scenario depicted in relation to the consecutively-ordered flow diagrams 1000A-1000E of FIGS. 10A-10E. In the example of FIGS. 10A-10E, each one of at least some of the nodes (e.g. S1, L1, L3, and L4 as shown) may maintain a state table ("MROUTE STATE TABLE") for multicast operation. Each multicast state table may include a source device identifier for identifying a source device ("SRC") and a multicast group identifier for identifying a multicast group ("GRP"), as well as an interface identifier or reverse path forwarding ("RPF") identifier of a reverse forwarding path.

Figure 10A:
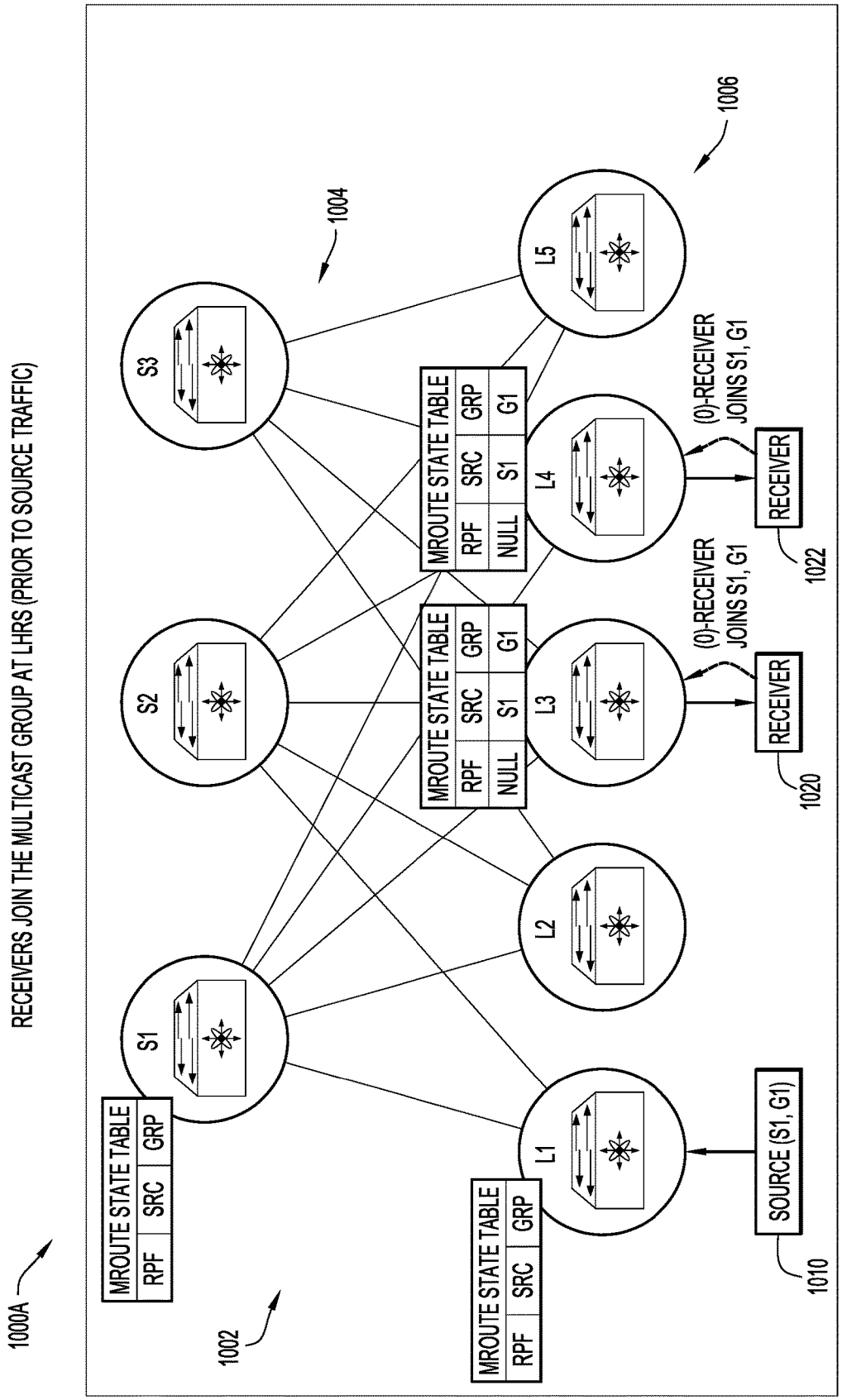
FIGS. 10A-10E are flow diagrams associated with an example flow for multicast path selection with use of inventive techniques of the present disclosure.

In the flow diagram 1000A of FIG. 10A, before a source device 1010 begins to communicate multicast traffic for a multicast group (S1, G1) at L1 (e.g. the FHR), a receiver device 1020 may join the multicast group (S1, G1) at L3 (step 0 of FIG. 10A) and a receiver device 1022 may join the multicast group (S1, G1) at L4 (also step 0 of FIG. 10A). Each join may be an (S, G) join or a (*, G) join, as examples. At this time, no PFM-SD based message for the multicast group has been received at the leaf nodes 1006. Thus, at this time, neither L3 nor L4 will send a join upstream to a spine node, but will wait until the appropriate PFM-SD based message is received.

Figure 10B:
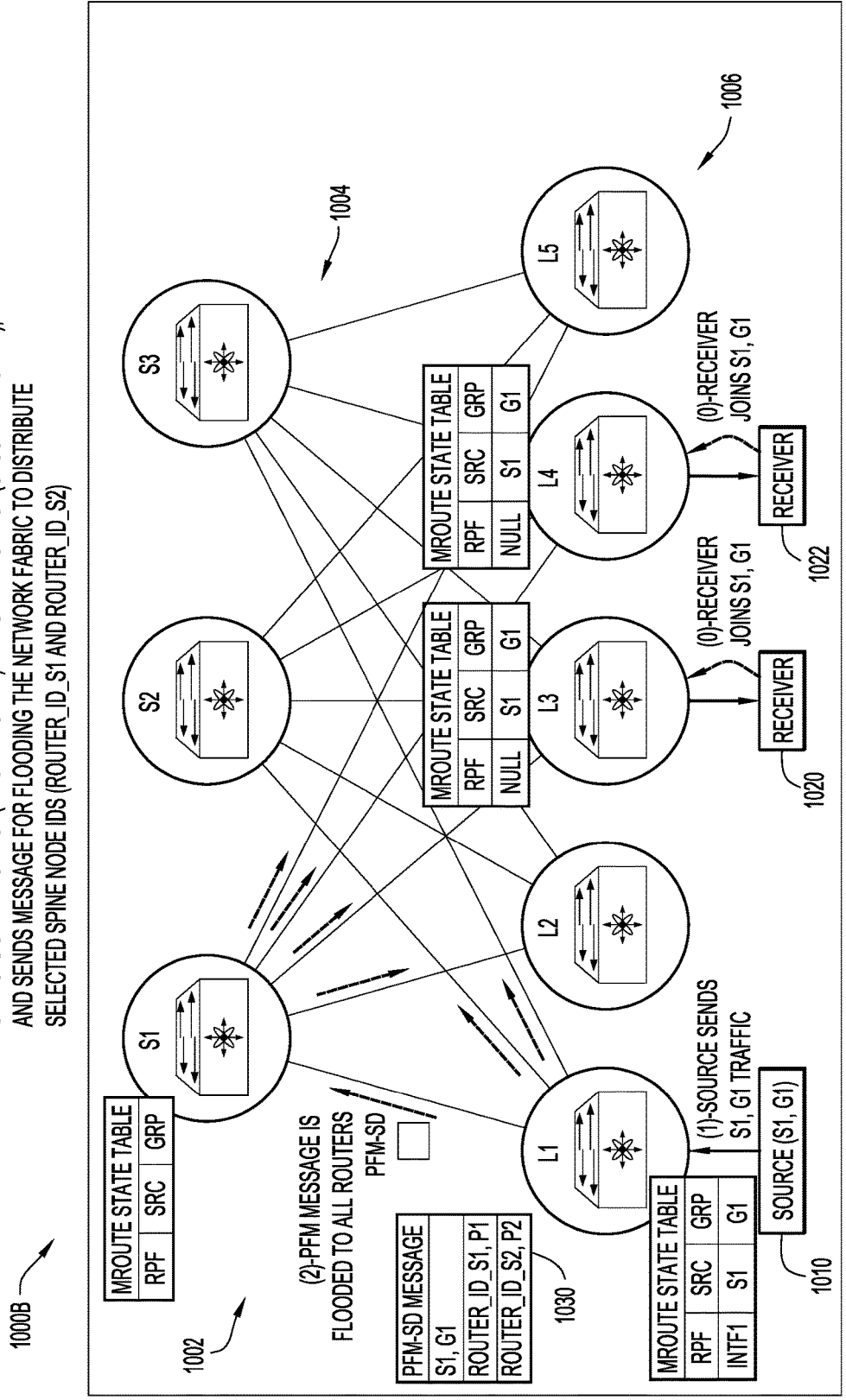

In the flow diagram 1000B of FIG. 10B, once the source device 1010 starts sending the multicast traffic (step 1 of FIG. 10B), L1 (e.g. the FHR) will create the multicast route and select one or more of the spine modes (e.g. S1, or S1 and S2) according to a predetermined selection function. In the illustrative scenario, the selection function is adapted to select one or more of preferred spine nodes having links with L1 with available, sufficient, or maximum bandwidth. L1 may then construct a PFM-SD based message 1030 to include a list of the one or more preferred or prioritized spine node identifiers as TLVs, and send the PFM-SD based message 1030 to flood the network fabric (step 2 of FIG. 10B). In some implementations, the message for flooding may be the same as or similar to message 600B described in relation to FIG. 6B. Here, the PFM-SD based message may include one or more TLVs, each having "type" value or indicator of PREFERRED_PATH_TLV_TYPE (for example). In the illustrative scenario, S1 and S2 are selected to be the preferred spine nodes, where S1 has a first priority and S2 has a second priority.

Figure 10C:
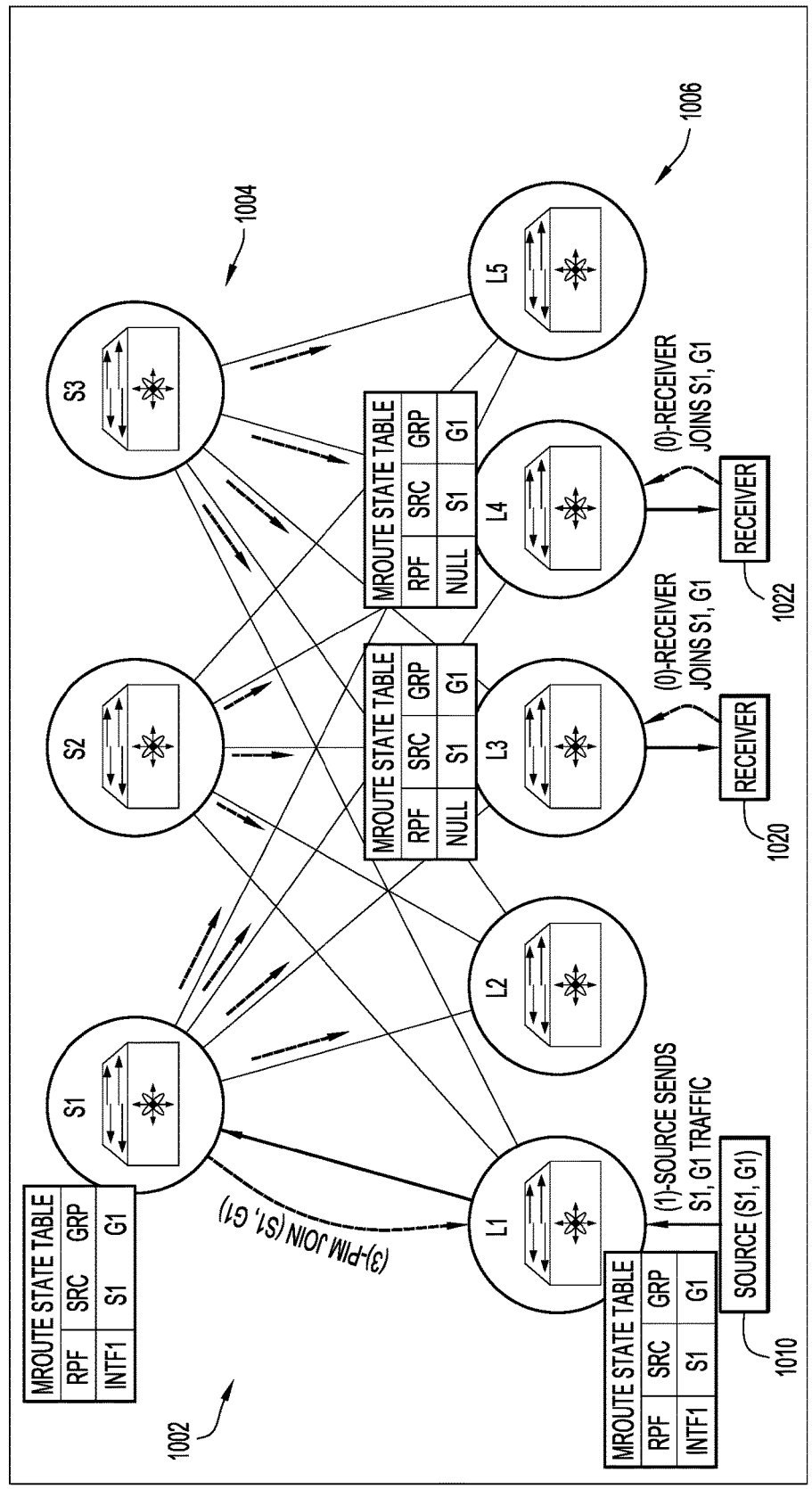

In the flow diagram 1000C of FIG. 10C, the spine nodes 1004 may receive the PFM-SD based message, and the highest-priority spine node (i.e. S1) will create the multicast route, joining and pulling the multicast traffic from L1 (step 3 of FIG. 10C), and thereby reserving bandwidth for the flow.

Figure 10D:
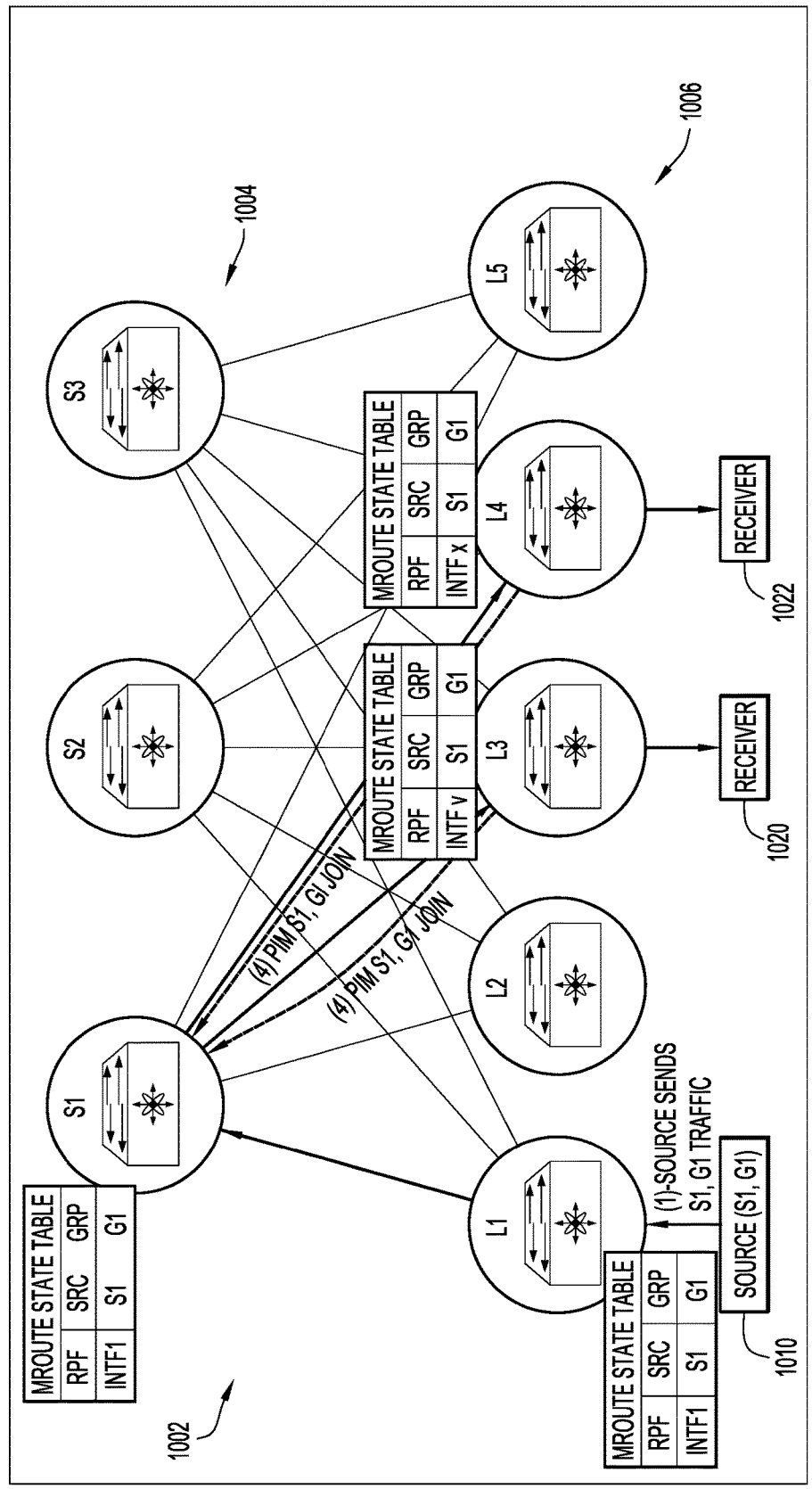
Figure 10E:
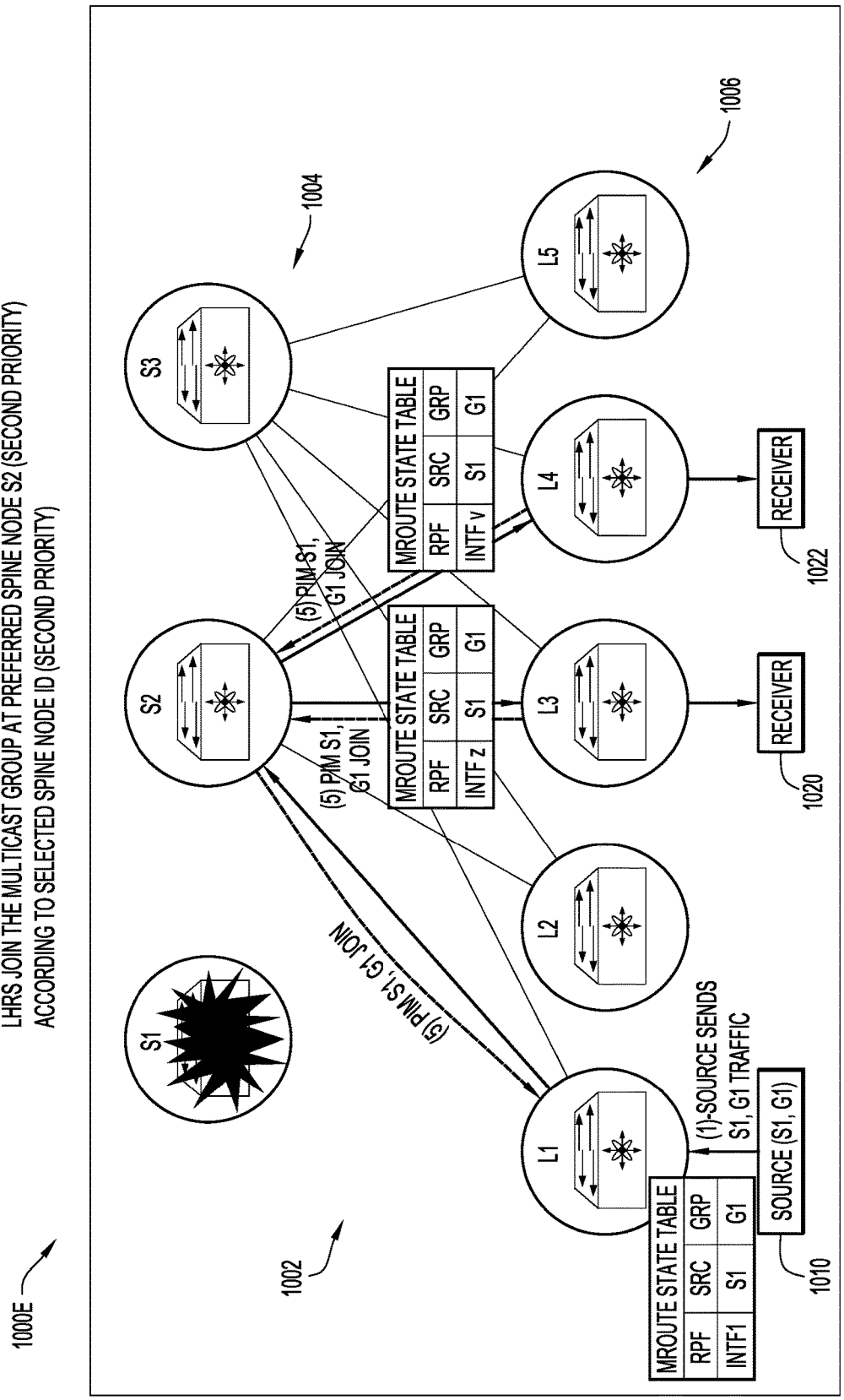

In the flow diagram 1000D of FIG. 10D, L3 and L4 may receive the PFM-SD based message and cache the list of prioritized spine node identifiers (e.g. in relation to the multicast source and/or group). For example, L3 and L4 may update their MROUTE STATE TABLEs as indicated. Here, L3 and L4 learn that the source device 1010 is active and can pull the multicast traffic from either S1 or S2 (as L1 has sufficient bandwidth toward each one of them). L3 and L4, which have interested receiver devices 1020 and 1022, may check if sufficient bandwidth is available on any link toward the highest-priority spine node, S1. If so, each one of L3 and L4 will send a join toward S1 and build the multicast tree. On the other hand, if sufficient bandwidth with respect to S1 is not available, L3 and L4 will try with the next highest-priority spine node, S2. In the illustrative scenario, sufficient bandwidth is available with respect to S1, and therefore L3 and L4 join the multicast group at the highest-priority spine node, S1, as indicated in the figure (step 4 of FIG. 10D). Thus, the mechanism may reduce or eliminate an unnecessary replication of multicast traffic between source and receiver devices.

During multicast operation, a prioritized spine node may be reloaded or fail or otherwise become unavailable. In the flow diagram 1000E of FIG. 10E, it is shown that the highest-priority spine node (e.g. S1) has failed. In response, since each leaf node has the next-priority spine node cached in memory, L3 and L4 will move to (i.e. join at) the next highest-priority spine node, S2 (step 5 of FIG. 10E), ensuring that no unnecessary multicast duplication will occur.

In the same way, L1 (i.e. the FHR) will identify that S1 has been reloaded and, in response, will remove the spine node identifier of S1 from the PFM-SD based message. If S1 comes back up after the reload, L1 will modify the priority of spine nodes in the PFM-SD based message (i.e. S2 as first priority and S1 as second priority). If a new receiver device joins at a new leaf node, L1 will give preference to joining the multicast group at the newly-preferred spine node (i.e. S2) rather than the previously-used spine node (i.e. S1).

Again, the PFM-SD based message may additionally include a list of one or more excluded spine node identifiers for identifying one or more excluded spine nodes. Here, the PFM-SD based message may include one or more TLVs, each having a "type" value or indicator of DENIED_PATH-_TLV_TYPE (for example). In such implementations, the FHR is able to distribute a list of spine nodes that LHRs should not use when selecting a path, even if those spine nodes are the only ones having links with available bandwidth.

Thus, the above-described additional feature may give an administrator a way in which to progressively isolate a given spine node from (e.g. all) future operations, while ensuring that the spine node serves the current ones. This feature may also be used when a FHR has no bandwidth available toward a given spine node and a new source device starts sending multicast traffic for a given (S, G). If no bandwidth is available toward S3, for example, the FHR may send the PFM-SD based message having S1 and S2 in the "prioritized list" and having S3 in the "denied list." This ensures that a new LHR will not attempt with S3 if it has insufficient bandwidth available toward S1 and S2.

Reference is now made back to FIGS. 3A-3B to illustrate the inventive techniques embodied in the IP network media data fabric 102 of FIG. 1. The example operation may illustrate the use of any of the techniques described above, at least in relation to FIGS. 4A-4B, 5A-5B, 6, 7A-7B, 8A-8B, and 10A-10E.

In FIG. 3A, a flow diagram 300a for describing a method of operation of a leaf switch which serves as a FHR for multicast traffic in the IP network media data fabric is shown. Leaf switch 206a may include a link/spine selection module 352 and a flooding mechanism 382. The flooding mechanism 382 may have a "FHR" function portion which is for distributing spine node identifiers of preferred spine nodes in a message for flooding the network fabric according to some implementations of the present disclosure. Source device 106 may begin sending multicast traffic to leaf switch 206a (step 0 of FIG. 3A). In response, leaf switch 206a may select one of the links to one of the spine switches with use of a predetermined selection function 380 of link/spine selection module 352 (step 1 of FIG. 3A). The predetermined selection function 380 may select a link/spine node based on available bandwidth with the spine nodes. In the present example, leaf switch 206a selects spine switch 202a. Leaf switch 206a may then send a message for flooding the network fabric (step 2 of FIG. 3A). The message for flooding the network fabric may include at least one spine node identifier corresponding to spine switch 202a. Spine switch 202a may receive the message and, in response, send a PIM Join to leaf switch 206a (step 3 of FIG. 3A). Leaf switch 206a may receive the PIM Join and begin to forward multicast traffic from the source device 106 to spine switch 202a (step 4 of FIG. 3A).

As shown in FIG. 3A, bandwidth of the links may be managed, tracked, and/or monitored with use of a stored association 354 between links and available tokens. Each token may represent a fixed amount of bandwidth. A number of available tokens associated with a given link may represent the current amount of bandwidth available on the link. In FIG. 3A, the stored association 354 is shown between link B1 and X1 available tokens, link B2 and X2 available tokens, link B3 and X3 available tokens, and link B4 and X4 available tokens. An example of a token allocation table 356 is also illustrated in FIG. 3A, showing that a single token represents 1.5 Gbps bandwidth. Here, 1 token may be allocated for 1.5 Gbps bandwidth, 2 tokens may be allocated for 3.0 Gbps bandwidth, 4 tokens may be allocated for 6.0 Gbps bandwidth, 8 tokens may be allocated for 12 Gbps bandwidth, etc. Thus, in this example, a token allocation procedure may be performed to track the available/unavailable or used/unused bandwidth of the links. Tokens may be deallocated as well when sources and/or receivers leave.

In FIG. 3B, a flow diagram 300b for describing a method of operation of a leaf switch which serves as a LHR for multicast traffic in the IP network media data fabric is shown. Leaf switch 208a may include a link/spine selection module 362 and a flooding mechanism 384. The flooding mechanism 384 may have a "LHR" function portion which is for receiving and caching spine node identifiers in a message for flooding in order to perform multicast path selection according to some implementations of the present disclosure. It is assumed that leaf switch 208a has already received a message for flooding which includes at least one spine node identifier, and has cached these data. Leaf switch 208a may receive a PIM Join from receiver device 108 (step 1 of FIG. 3B). In response, leaf switch 208a may select a spine node according to a cached spine node identifier (step 2 of FIG. 3B). In the present example, leaf switch 208a selects spine switch 202a according to the cached spine node identifier. The selection may be further based on available bandwidth with the spine nodes. Leaf switch 208a may send a PIM Join to spine switch 202a (step 3 of FIG. 3B) and then pull the multicast traffic from spine switch 202a (step 4 of FIG. 3B).

Also as shown in FIG. 3B, bandwidth of the links may be managed, tracked, and/or monitored with use of a stored association 364 between links and available tokens. Each token may represent a fixed amount of bandwidth. Again, a number of available tokens associated with a given link may represent the current amount of bandwidth available on the link. In FIG. 3B, the stored association 364 is shown between link B1 and X1 available tokens, link B2 and X2 available tokens, link B3 and X3 available tokens, and link B4 and X4 available tokens. An example of a token allocation table 368 is also illustrated in FIG. 3B, showing that a single token represents 1.5 Gbps bandwidth. Here, 1 token may be allocated for 1.5 Gbps bandwidth, 2 tokens may be allocated for 3.0 Gbps bandwidth, 4 tokens may be allocated for 6.0 Gbps bandwidth, 8 tokens may be allocated for 12 Gbps bandwidth, etc. Thus, in this example, the token allocation procedure may also be performed to track the available/unavailable or used/unused bandwidth of the links. Tokens may be deallocated as well when sources and/or receivers leave.

Figure 11:
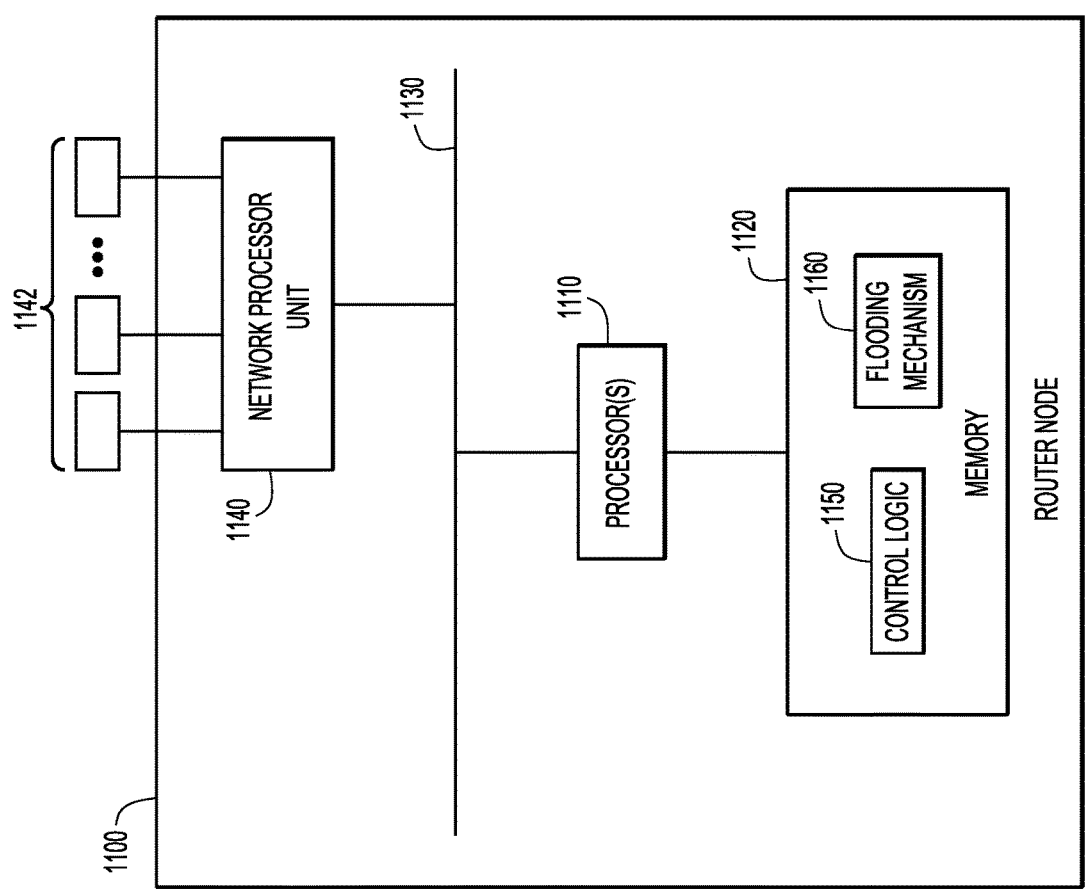
FIG. 11 illustrates a block diagram of a router node (e.g. spine node or switch) configured to perform operations according to some implementations.

FIG. 11 illustrates a block diagram of basic relevant components of a router node 1100 (e.g. a spine node or switch) configured to perform operations described above according to some implementations. The network node 1100 includes one or more processors 1110 for control, memory 1120, a bus 1130 and a network processor unit 1140. The processor 1110 may be a microprocessor or microcontroller. The network processor unit 1140 may include one or more Application Specific Integrated Circuits (ASICs), line cards, etc., and facilitates network communications between the router node 1100 and other network nodes.

There are a plurality of network ports 1142 at which the router node 1100 receives packets and from which router node 1100 sends packets into the network. The processor 1110 executes instructions associated with software stored in memory 1120. Specifically, the memory 1120 stores instructions for control logic 1150 that, when executed by the processor 1110, causes the processor 1110 to perform various operations on behalf of router node 1100 as described herein. The memory 1120 may store a flooding mechanism 1160 (e.g. the FHR and/or LHR functionality, based on PFM-SD or the like) for distributing and processing spine node identifiers according to some implementations of the present disclosure. It should be noted that in some embodiments, the control logic 1150 may be implemented in the form of firmware implemented by one or more ASICs as part of the network processor unit 1140.

The memory 1120 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 1120 may comprise one or more tangible (non-transitory) computer readable storage media (e.g., a memory device) encoded with software comprising computer executable instructions and when the software is executed (by the processor 1110) it is operable to perform certain network node operations described herein.

While various aspects of implementations within the scope of the appended claims are described above, it should be apparent that the various features of implementations described above may be embodied in a wide variety of forms and that any specific structure and/or function described above is merely illustrative. For example, the techniques of the present disclosure may be applied to any suitable type of network or Clos-based network. Also for example, the message for flooding which may indicate to prioritize joining (or to prohibit joining) may be considered as an (explicit) instruction to (some or) all of the leaf nodes to prioritize joining (or to prohibit joining).

Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

Although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure. As already described above, the first and second sets of inventive techniques (and associated messages) may be combined or used separately and independently.

It will also be understood that, although the terms "first," "second," etc. may be used herein to describe various elements, these elements should not be limited by these terms. These terms are used to distinguish one element from another. For example, a first spine node could be termed a second spine node, and similarly, a second spine node could be termed a first spine node, without changing the meaning of the description, so long as all occurrences of the "first spine node" are renamed consistently and all occurrences of the "second spine node" are renamed consistently. The first spine node and the second spine node are both spine nodes, but they are not the same spine node.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at a router node configured for communication of multicast traffic in a network fabric comprising a plurality of spine nodes interconnected to a plurality of leaf nodes, and further configured as one of the leaf nodes,
sending a message for flooding the network fabric to communicate the message to other leaf nodes in the network fabric based on identifying an indication of communication of multicast traffic for a multicast group from a source device, the message including at least one spine node identifier of at least one excluded spine node to exclude from joining to the multicast group for the communication of the multicast traffic; and
forwarding the multicast traffic for the multicast group to one of the plurality of spine nodes other than the at least one excluded spine node indicated by the at least one spine node identifier.

2. The method of claim 1, wherein the message is for indicating, to at least one of the other leaf nodes, to prohibit joining to the multicast group at the at least one excluded spine node according to the at least one spine node identifier.

3. The method of claim 1, wherein the at least one spine node identifier of the at least one excluded spine node comprises a plurality of spine node identifiers of a plurality of excluded spine nodes to exclude from joining to the multicast group for the communication of the multicast traffic.

4. The method of claim 1, wherein the message further includes at least one of a source address of the source device and a multicast group address of the multicast group for the multicast traffic.

5. The method of claim 1, wherein the message further includes at least one preferred spine node identifier of at least one preferred spine node that is selected for joining to the multicast group for the communication of the multicast traffic.

6. The method of claim 1, wherein a Protocol Independent Multicast (PIM) Flooding Mechanism (PFM) is used in the sending of the message for flooding the network fabric.

7. The method of claim 1, wherein the at least one spine node identifier is included in the message as a type-length-value (TLV).

8. The method of claim 1, wherein the router node is operative to serve as a first hop router for the multicast traffic of the multicast group.

9. The method of claim 1, wherein the router node is part of an Internet Protocol (IP) network media data fabric which has the plurality of spine nodes interconnected to the plurality of leaf nodes as a plurality of spine switches interconnected to a plurality of leaf switches.

10. A router node comprising:
one or more processors;
a plurality of interfaces configured to connect in a network fabric comprising a plurality of spine nodes interconnected to a plurality of leaf nodes, wherein the router node is configured as one of the leaf nodes;
the one or more processors being configured to:
send, via an interface, a message for flooding the network fabric to communicate the message to other leaf nodes in the network fabric based on an indication of communication of multicast traffic for a multicast group from a source device, the message including at least one spine node identifier of at least one excluded spine node to exclude from joining to the multicast group for the communication of the multicast traffic; and
forward the multicast traffic for the multicast group to one of the plurality of spine nodes other than the at least one excluded spine node indicated by the at least one spine node identifier.

11. The router node of claim 10, which is operative to serve as a first hop router for the communication of the multicast traffic, and wherein the message is for indicating, to at least one of the other leaf nodes, to prohibit joining to the multicast group at the at least one excluded spine node indicated by the at least one spine node identifier.

12. The router node of claim 10, wherein the at least one spine node identifier of the at least one excluded spine node comprises a plurality of spine node identifiers of a plurality of excluded spine nodes to exclude from joining to the multicast group for the communication of the multicast traffic.

13. The router node of claim 10, wherein the message further includes at least one preferred spine node identifier of at least one preferred spine node that is selected for joining to the multicast group for the communication of the multicast traffic.

14. The router node of claim 10, which is part of an Internet Protocol (IP) network media data fabric which has the plurality of spine nodes interconnected to the plurality of leaf nodes as a plurality of spine switches interconnected to a plurality of leaf switches.

15. A method comprising:
at a router node configured for communication of multicast traffic in a network fabric comprising a plurality of spine nodes interconnected to a plurality of leaf nodes, and further configured as one of the leaf nodes,
receiving a message which is flooded in the network fabric by an originating leaf node which is operative to forward multicast traffic for a multicast group from a source device, the message including at least one spine node identifier of at least one excluded spine node;
receiving, from a receiver device, a request to join to the multicast group for the communication of the multicast traffic; and
joining to the multicast group at one of the plurality of spine nodes other than the at least one excluded spine node indicated by the at least one spine node identifier for the communication of the multicast traffic to the receiver device.

16. The method of claim 15, further comprising:
prohibiting joining to the multicast group at the at least one excluded spine node according to the at least one spine node identifier.

17. The method of claim 15, wherein the message further includes at least one preferred spine node identifier of at least one preferred spine node that is selected for joining to the multicast group for the communication of the multicast traffic, and the method further comprises:
prioritizing joining to the multicast group at the at least one preferred spine node according to the at least one preferred spine node identifier for the communication of the multicast traffic.

18. The method of claim 15, wherein the message which is flooded in the network fabric is flooded in accordance with a Protocol Independent Multicast (PIM) Flooding Mechanism (PFM).

19. The method of claim 15, wherein the router node serves as a last hop router for the multicast traffic of the multicast group.

20. The method of claim 15, wherein the router node is part of an Internet Protocol (IP) network media data fabric which as the plurality of spine nodes interconnected to the plurality of leaf nodes as a plurality of spine switches interconnected to a plurality of leaf switches.

* * * * *